United States Patent
Katsumata et al.

(10) Patent No.: US 9,461,578 B2
(45) Date of Patent: Oct. 4, 2016

(54) MOTOR CONTROL DEVICE AND MOTOR CONTROL METHOD

(71) Applicant: Nissan Motor Co., Ltd., Yokohama-shi, Kanagawa (JP)

(72) Inventors: Yuji Katsumata, Atsugi (JP); Ken Ito, Machida (JP); Takashi Nakajima, Ebina (JP); Akira Sawada, Atsugi (JP); Shou Oono, Isehara (JP); Hiroyuki Komatsu, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/648,429

(22) PCT Filed: Nov. 28, 2013

(86) PCT No.: PCT/JP2013/082017
§ 371 (c)(1),
(2) Date: May 29, 2015

(87) PCT Pub. No.: WO2014/103601
PCT Pub. Date: Jul. 3, 2014

(65) Prior Publication Data
US 2015/0303858 A1     Oct. 22, 2015

(30) Foreign Application Priority Data

Dec. 28, 2012  (JP) ................................ 2012-287899

(51) Int. Cl.
*G05B 5/01* (2006.01)
*H02P 27/06* (2006.01)
(Continued)

(52) U.S. Cl.
CPC ............... *H02P 27/06* (2013.01); *B60L 15/20* (2013.01); *B60L 15/2072* (2013.01); *B60T 1/005* (2013.01);
(Continued)

(58) Field of Classification Search
CPC ...... G05B 5/01; G05D 3/1445; G05D 3/122; H02P 27/06; H02P 23/065
USPC ........ 318/611, 612, 630, 56, 57, 63, 400.01, 318/400.14, 400.15, 370, 371, 372, 373, 318/374, 375, 376, 430, 432, 437, 521, 114, 318/115, 119, 128, 135, 702, 703, 727, 742, 318/757, 779, 799, 599, 800, 801, 811, 268, 318/362; 310/326, 156.74; 363/40, 44, 95, 363/120, 175
See application file for complete search history.

(56) References Cited

U.S. PATENT DOCUMENTS 6,756,758 B2 *  6/2004  Karikomi ............... G05D 19/02
                                                           180/197

FOREIGN PATENT DOCUMENTS

JP     8-154305 A     6/1996
JP     2003-9566 A    1/2003
(Continued)

*Primary Examiner* — Antony M Paul
(74) *Attorney, Agent, or Firm* — Global IP Counselors, LLP

(57) ABSTRACT

A motor control device of a vehicle includes a motor and a lock mechanism for locking the rotation of vehicle wheels. The motor control device includes a detection device for detecting release of the lock mechanism, a damping control device for suppressing torsional vibration of a drive shaft, and a current control device for controlling current flowing to the motor on the basis of a motor torque command value set by the damping control device. The current control device channels an excitation current for generating a magnetic flux in the motor on the basis of the detection result of the detection device.

23 Claims, 10 Drawing Sheets

(51) Int. Cl.
   *B60L 15/20*      (2006.01)
   *H02P 21/05*      (2006.01)
   *B60W 10/00*      (2006.01)
   *B60T 1/00*       (2006.01)

(52) U.S. Cl.
   CPC ............ *B60W 10/00* (2013.01); *H02P 21/05* (2013.01); *B60L 2220/12* (2013.01); *B60L 2240/421* (2013.01); *B60L 2240/423* (2013.01); *B60L 2240/429* (2013.01); *B60L 2240/461* (2013.01); *B60L 2240/465* (2013.01); *B60L 2240/547* (2013.01); *B60L 2260/26* (2013.01); *B60L 2270/145* (2013.01); *Y02T 10/643* (2013.01); *Y02T 10/645* (2013.01); *Y02T 10/7275* (2013.01)

(56) References Cited

FOREIGN PATENT DOCUMENTS

| | | |
|---|---|---|
| JP | 2005-185000 A | 7/2005 |
| JP | 2005-269834 A | 9/2005 |
| JP | 2006-136184 A | 5/2006 |
| JP | 2007-329982 A | 12/2007 |
| JP | 2012-100429 A | 5/2012 |

* cited by examiner

MOTOR CONTROL DEVICE AND MOTOR CONTROL METHOD

CROSS-REFERENCE TO RELATED APPLICATIONS

This application is a U.S. National stage application of International Application No. PCT/JP2013/082017, filed Nov. 28, 2013, which claims priority to JP Patent Application No. 2012-287899 filed on Dec. 28, 2012, the contents of each of which are hereby incorporated herein by reference.

BACKGROUND

1. Field of the Invention

The present invention relates to a motor control device and a motor control method.

2. Background Information

Japanese Laid-Open Patent Application No. 8-154305 discloses a method for controlling an induction motor, in which a magnetic flux command Φref is set to a synchronous magnetic flux Φs equal to about 25% of a rated value in areas in which a torque command Tref belongs to a range of 0 to tr1, and when the torque command is approximately 0, the magnetic flux command is decided so as to yield a synchronous magnetic flux that enables asynchronous input, thereby improving the responsiveness of the torque command Tref to an accelerator command Acc (Japanese Laid-Open Patent Application No. 8-154305).

SUMMARY

When the above-described method for controlling an induction motor is applied in a case of the torque command being set to damp drive shaft torsion when, for example, the vehicle is on a steep slope or the like and the drive shaft twists and the vehicle starts off after having been stopped, the magnetic flux command is set from a torque command of 0, and torque that damps the twisting can therefore be outputted with high responsiveness to the command value.

However, large battery power consumption has been a problem because excitation current must constantly be channeled.

A problem to be solved by the present invention is to provide a motor control device or a motor control method whereby vibration caused by torsion of the drive shaft is suppressed while battery power consumption is suppressed.

The present invention solves the above problem by using a detection means (device) for detecting the releasing of a lock mechanism for locking the rotation of the vehicle wheels, suppressing the torsional vibration of the drive shaft, controlling the current channeled to a motor on the basis of a motor torque command value set by a damping control means (device), and channeling excitation current for generating a magnetic flux in the motor on the basis of the detection result of the detection device.

In the present invention, there is no need to constantly channel excitation current due to the excitation current being channeled and the motor magnetic flux being raised in conformity with the lock release; therefore, vibration caused by drive shaft torsion can be suppressed while battery power consumption is suppressed.

BRIEF DESCRIPTION OF THE DRAWINGS

Referring now to the attached drawings which form a part of this original disclosure.

FIGS. 7A-F are graphs showing characteristics of motor control device according to a comparative example, in which FIG. 7A shows characteristics of torque command value ($T_{m2}$*), FIG. 7B shows torque characteristics of output shaft, FIG. 7C shows motor speed characteristics, FIG. 7D shows torque current characteristics of drive motor 3, FIG. 7E shows excitation current characteristics of drive motor 3, and FIG. 7F shows rotor magnetic flux characteristics.

FIGS. 8A-F are graphs showing characteristics of motor control device according to the present invention, wherein FIG. 8A shows characteristics of torque command value ($T_{m2}$*), FIG. 8B shows torque characteristics of output shaft, FIG. 8C shows motor speed characteristics, FIG. 8D shows torque current characteristics of drive motor 3, FIG. 8E shows excitation current characteristics of drive motor 3, and FIG. 8F shows rotor magnetic flux characteristics.

DETAILED DESCRIPTION OF EMBODIMENTS

Embodiments of the present invention are described below on the basis of the drawings.

First Embodiment

Figure 1:
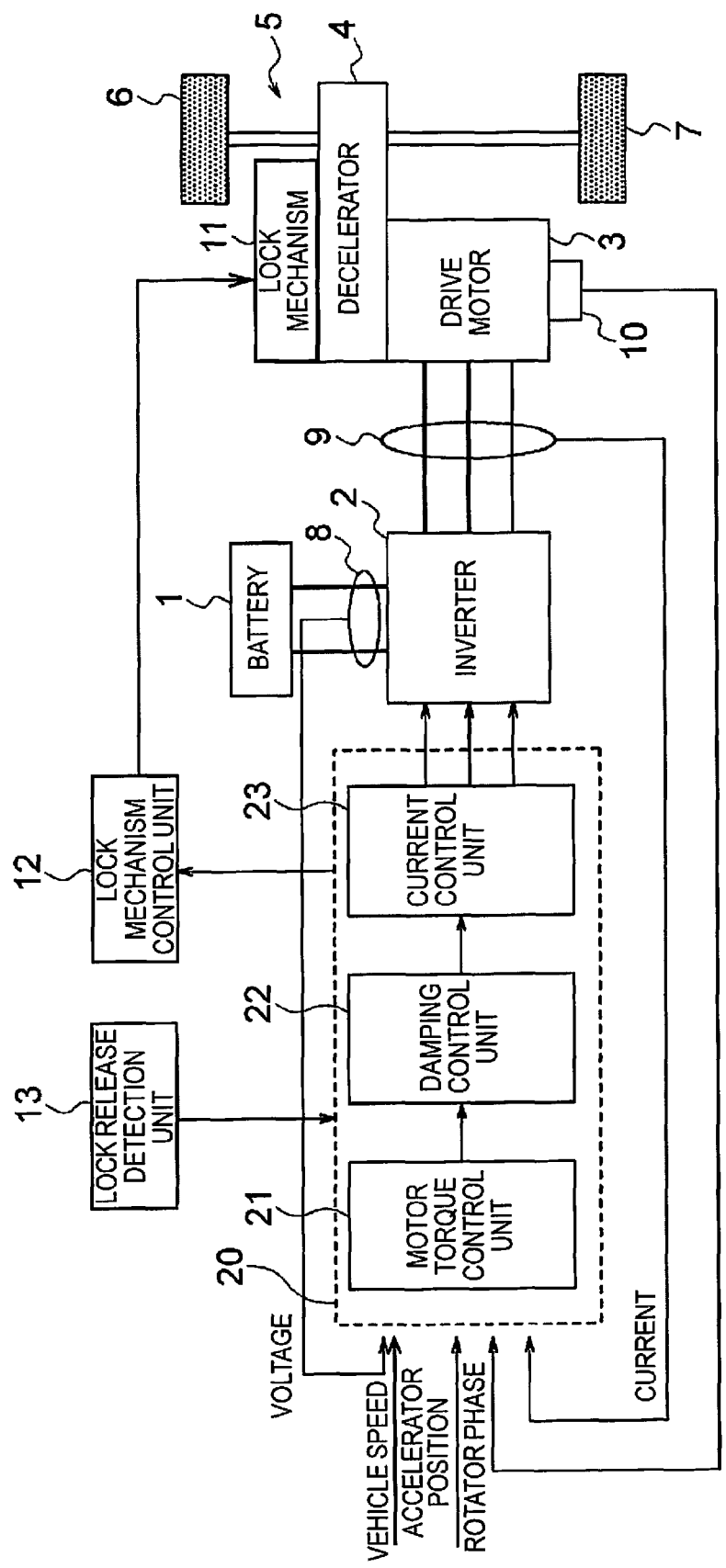
FIG. 1 is a block diagram of electric vehicle system according to an embodiment of the present invention.

FIG. 1 is a block diagram showing the configuration of an electric vehicle system equipped with a motor control device according to an embodiment of the present invention. The following description is of an example in which the present motor control device is applied to an electric automobile, but the present motor control device can also be applied to vehicle other than an electric automobile, such as a hybrid automobile (HEV), for example.

As shown in FIG. 1 a vehicle including the present motor control device comprises a battery 1, an inverter 2, a drive motor 3, a decelerator 4, a drive shaft 5, vehicle wheels 6, 7, a voltage sensor 8, a current sensor 9, a rotational speed sensor 10, a lock mechanism 11, a lock mechanism control unit 12, a lock release detection unit 13, and a motor controller 20.

The battery 1 is the motive power source of the vehicle, and is configured by a plurality of secondary cells connected in series or in parallel. The inverter 2 has a power conversion circuit in which a plurality of switching elements such as IGBTs or MOSFETs are connected to each phase. By switching these switching elements between on and off by drive signals from the motor controller 20, the inverter 2 converts DC power outputted from the battery 1 to AC power and outputs the AC power to the drive motor 3 to drive the drive motor 3. The inverter 2 also inversely converts AC power outputted by regeneration of the drive motor 3 and outputs this converted power to the battery 1.

The drive motor 3 is the drive source of the vehicle, and is an induction motor for transferring drive force to the vehicle wheels 6, 7 via the decelerator 4 and the drive shaft 5. When the vehicle is traveling, the drive motor 3 recovers the kinetic energy of the vehicle as electric energy by being rotated by the vehicle wheels 6, 7 and generating regenerative drive force. The battery 1 is thereby discharged by the power running of the drive motor 3 and is charged by the regeneration of the drive motor 3.

The voltage sensor 8 is a sensor for registering the voltage of the battery 1, and is connected between the battery 1 and the inverter 2. The voltage registered by the voltage sensor 8 is outputted to the motor controller 20. The current sensor 9 is a sensor for registering the current of the drive motor 3, and is connected between the inverter 2 and the drive motor 3. The current registered by the current sensor 9 is outputted to the motor controller 20. The rotational speed sensor 10 is a sensor for registering the rotational speed of the drive motor 3, and is formed from a resolver or the like. The registered value of the rotational speed sensor 10 is outputted to the motor controller 20.

The lock mechanism 11 is a mechanical device for stopping the vehicle wheels 6, 7 from rotating. The lock mechanism is a mechanism for mechanically stopping the drive shaft from rotating by a gear when, for example, the shift lever has been maneuvered into the parking (P) position. Alternatively, the lock mechanism 11 is equivalent to a parking brake (or a foot brake) for operating the brake by mean s of a wire mechanism, for example. The lock mechanism 11 operates on the basis of the control of the lock mechanism control unit 12.

The lock mechanism control unit 12 is a controller for operating the lock mechanism 11 on the basis of the detection result of the lock release detection unit 13. The lock mechanism control unit 12 also operates the lock mechanism 11 on the basis of a control signal sent from the motor controller 20 to activate the lock mechanism 11. The lock mechanism control unit 12 and the motor controller 20 are shown as separate configurations in FIG. 1, but the lock mechanism control unit 12 and the motor controller 20 may be formed from a single controller.

The lock release detection unit 13 is a detection unit for detecting that the lock mechanism 11 will be released by detecting a vehicle occupant's action for releasing the lock mechanism 11. Specifically, the lock release detection unit 13 does not detect that the lock mechanism 11 has actually operated and been released, but detects the state before the actual operation of the lock mechanism 11. The lock release detection unit 13 determines that the lock mechanism 11 will be released by the following method, for example.

The lock release detection unit 13 determines that the lock mechanism 11 will be released when the position of the shift lever of the vehicle has been changed from the parking position to a position other than parking, or in other words, when the previous shift lever position was in the parking position and the current shift lever position is in a position other than parking.

Alternatively, the lock release detection unit 13 detects that the lock mechanism 11 will be released when a parking release switch (not shown) of the shift lever is in a release state. The lock mechanism 11 will be released when the parking release switch is on. Therefore, the lock release detection unit 13 determines that the lock mechanism 11 will be released when the parking release switch is switched from off to on.

Alternatively, the lock release detection unit 13 determines that the lock mechanism 11 released when the shift lever position is in the parking position and a brake switch (not shown) of the brake pedal of the vehicle has been switched from off to on. The brake operates when the brake switch is on. To release the lock on the vehicle wheels, the shift lever position is then moved to a position other than parking, but the brake pedal must be pressed before the shift lever is moved. Therefore, the lock release detection unit 13 determines that the lock mechanism 11 will be released when the shift lever position is in the parking position, the brake switch was previously off, and the brake switch is previously on.

Alternatively, the lock release detection unit 13 determines that the lock mechanism 11 will be released when the rotational speed of the drive motor 3 is lower than a designated determination threshold and the brake switch has been switched from off to on. The rotational speed of the drive motor 3 is a value calculated on the basis of the registered value of the rotational speed sensor 10. The designated determination threshold is a threshold for assessing that the vehicle has stopped and the drive motor is not rotating. This determination threshold does not need to be zero and may be a value greater than zero.

In the above-described methods, the detection result detected by the lock release detection unit 13 is sent as a signal to the motor controller 20. The lock release detection unit 13 preferably detects a lock release via any one method of the above-described methods, but may detect a lock release via a combination of these methods or detect a lock release via another method.

On the basis of factors such as the vehicle speed (V), the accelerator position (APO), the rotator phase ($\theta_{re}$) of the drive motor 3, the current of the drive motor, and the voltage of the battery 1, the motor controller 20 generates a PWM signal for actuating the inverter 2 and outputs the signal to a driver circuit (not shown) which actuates the inverter 2. The driver circuit suppresses a drive signal for the switching elements of the inverter 2 and outputs the signal to the inverter 2 on the basis of a PWM control signal. The motor controller 20 thereby drives the drive motor 3 by actuating the inverter 2.

The motor controller 20 receives a signal representing the detection result of the lock release detection unit 13, and controls the drive motor 3 on the basis of the detection result. The motor controller 20 also has a motor torque control unit 21, a damping control unit 22, and a current control unit 23.

On the basis of vehicle information indicating vehicle variables inputted to the motor controller 20, the motor torque control unit 21 calculates a torque command value ($T_{m1}$*) for outputting the torque required by the user's maneuvering or the torque required by the system from the drive motor 3, and outputs the torque command value to the damping control unit 22.

The damping control unit 22 is a control unit for damping the vibration of the drive motor 3 and suppressing torsional vibration of the drive shaft 5, and on the basis of the torque command value ($T_{m1}$*) of the drive motor 3, the damping control unit calculates a torque command value ($T_{m2}$*) for damping the vibration of the drive motor 3 and outputs this torque command value to the current control unit 23.

The relationship between the vibration of the drive motor 3 and the releasing of the lock mechanism 11 is described herein. Vibration of the drive motor 3 occurs as a result of disturbances such as a slope in the road or gear backlash in the torque transfer system, model errors in factors such as transfer characteristics used to calculate the command value for driving the motor, and the like. Such vibration is also produced when the lock mechanism 11 is released as is described below.

A case is considered in which the vehicle is positioned on a sloped road surface such as an upward hill, and, e.g., the shift lever is set within parking range, and the vehicle is stopped without the foot brake or the parking brake being applied. In this case, the lock mechanism 11 operates due to the shift lever being set within parking range, and the vehicle therefore remains stopped even when the brake is released.

At this time, the vehicle wheels are not perfectly fixed in place, and the drive shaft therefore twists in accordance with the slope. When the driver intends to start the vehicle off while the drive shaft 5 has torsion, the driver presses the brake and sets the shift lever to a position other than parking. At this time, the lock mechanism 11 is released. The torsion accumulated in the drive shaft 5 is dispelled by the releasing of the lock mechanism 11, the drive shaft 5 therefore vibrates, and the rotating shaft of the drive motor 3 linked with the drive shaft 5 also vibrates. There is a risk that a vehicle occupant will abruptly experience shock from such vibration and the vehicle occupant will feel unsafe or uneasy. Such vibration is expressed below also as the vibration of park lock release shock.

Specifically, the damping control unit 22 suppresses the vibration of park lock release shock produced by the release of the lock mechanism 11, as well as other vibration, by calculating the torque command value ($T_{m2}$*).

Returning to FIG. 1, the current control unit 23 is a control unit which controls the current channeled to the drive motor 3 on the basis of the torque command value ($T_{m2}$*). The current control unit 23 is also a control unit for channeling excitation current to generate a magnetic flux in the drive motor 3 on the basis of the detection result of the lock release detection unit 13. The configuration of the current control unit 23 and the excitation current are described hereinafter.

Figure 2:
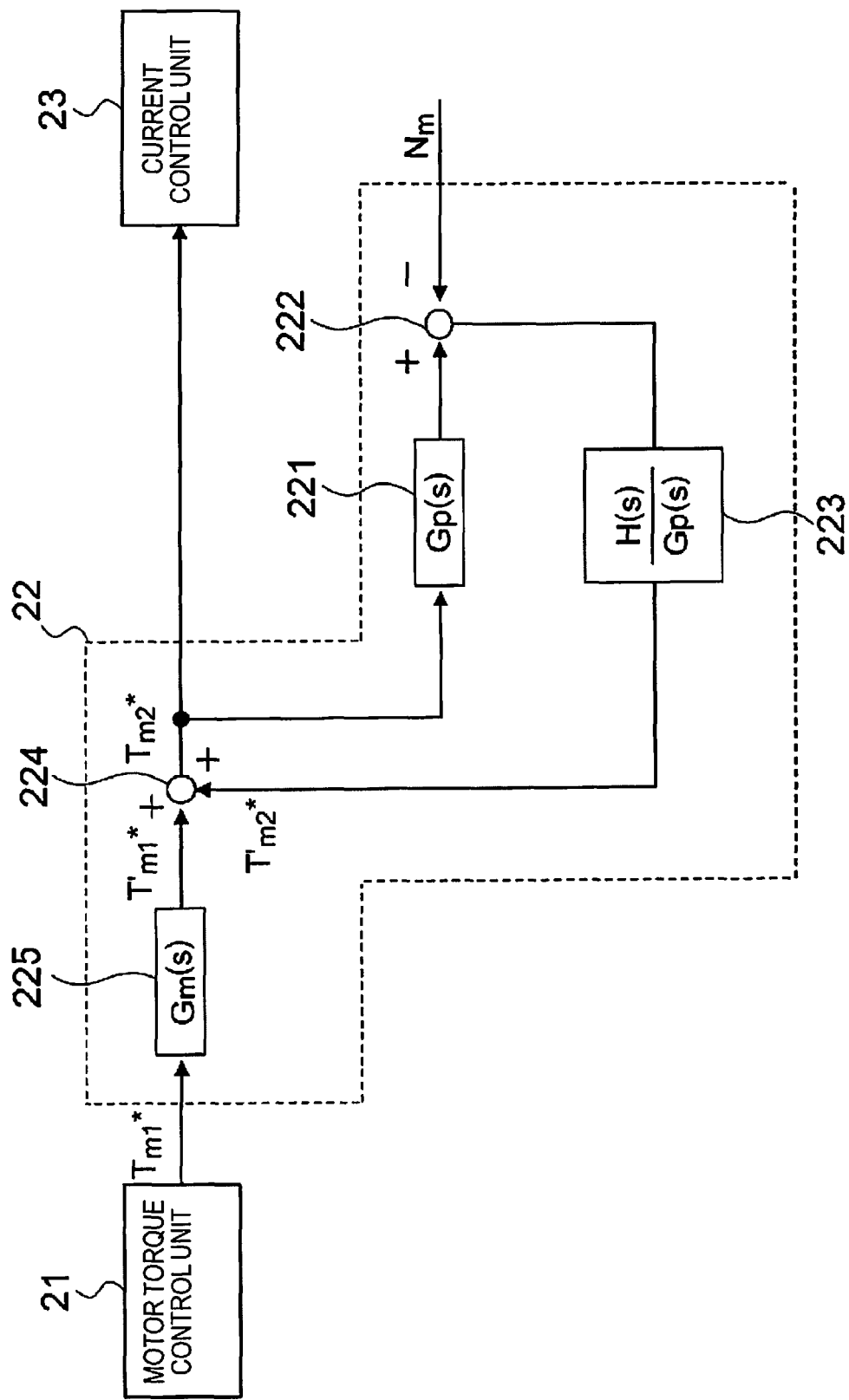
FIG. 2 is a block diagram of motor torque control unit, damping control unit, and current control unit of FIG. 1.
Figure 3:
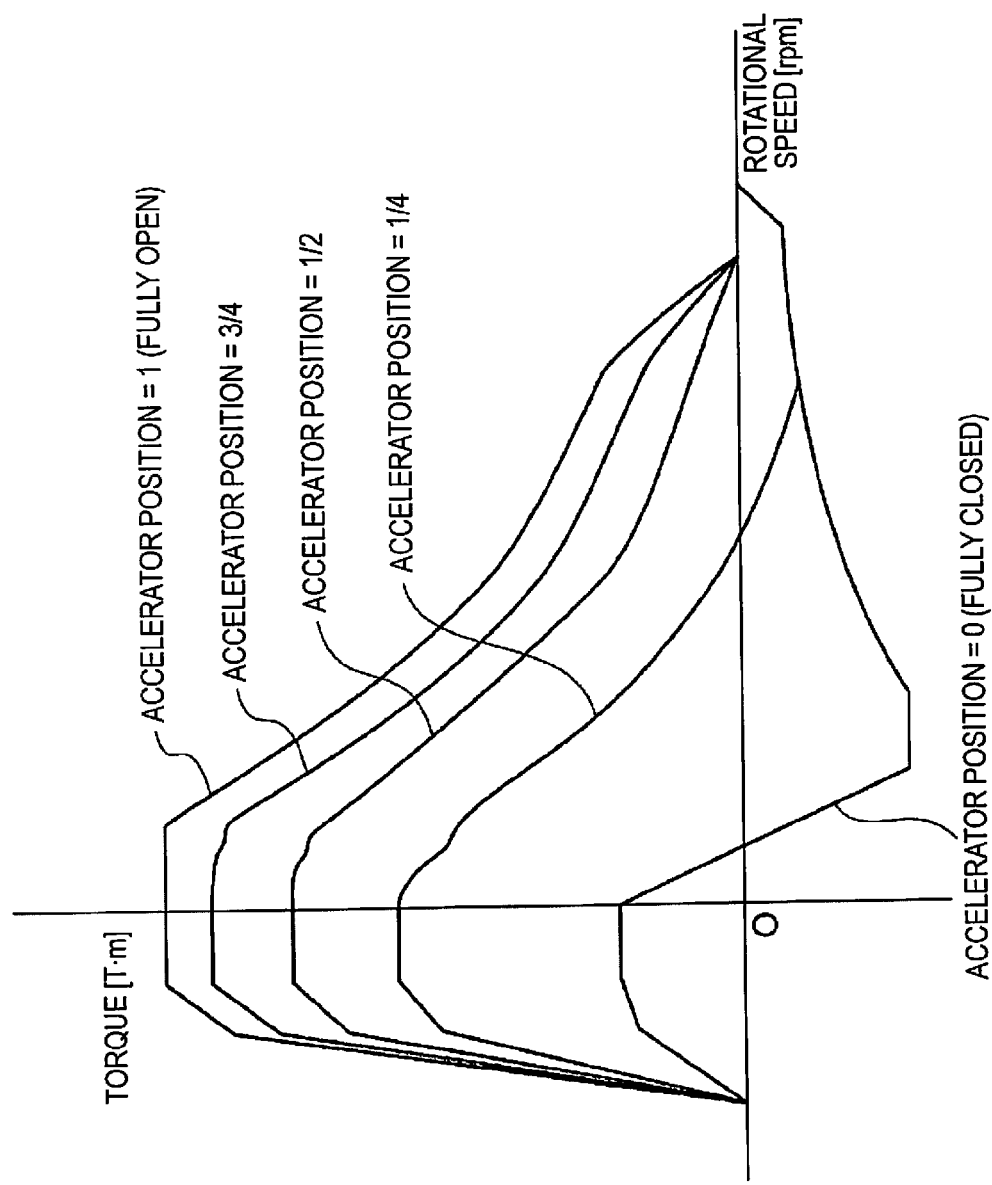
FIG. 3 is a graph for describing map referenced by current command value calculator of FIG. 2, showing correlation between motor speed and torque command value set for each accelerator position.

Next, FIGS. 2 and 3 are used to describe the control specifics of the motor torque control unit 21 and the configuration and control specifics of the damping control unit 22. FIG. 2 is a block diagram of the motor torque control unit 21, the damping control unit 22, and the current control unit 23. FIG. 3 is a graph showing the correlation, set for each accelerator position, between the motor speed and the torque command value.

A torque map showing the relationships of FIG. 3 stored in advance in the motor torque control unit 21. The torque map is set in advance, for each accelerator position, according to the relationship of the torque command value to the rotational speed of the drive motor 3. The torque map is set by torque command values for efficiently outputting torque from the drive motor 3, in relation to accelerator positions and motor speeds.

The motor speed is calculated on the basis of the registered value of the rotational speed sensor 10. The accelerator position is registered by an accelerator position sensor (not shown). The motor torque control unit 21 refers to the torque map to calculate the torque command value ($T_{m1}$*) corresponding to the inputted accelerator position (APO) and motor speed, and outputs the torque command value to the damping control unit 22. When the shift lever is set to the parking position or a neutral position, the torque command value ($T_{m1}$*) is zero. Calculating the torque command value ($T_{m1}$*) is not limited to only the accelerator position and the motor speed, and may also involve, e.g., the vehicle speed and other factors.

The damping control unit 22 has control blocks 221, 223, a subtracter 222, an adder 224, and a control block 225. The control blocks 221, 223, the subtracter 222, and the adder 224 constitute a feedback compensator, and the control block 225 constitutes a feedforward compensator.

The control block 221 is a control unit for estimating the motor speed relative to vehicle torque input. The control block 221 calculates an estimated rotational speed of the drive motor 3 from a transfer characteristic Gp(s) model, on the basis of the torque command value ($T_{m2}$*) outputted from the adder 224. Gp(s) is a model representing the transfer characteristic of torque input to the vehicle and motor rotational velocity (rotational speed).

The subtracter 222 calculates the deviation between the estimated rotational speed calculated by the control block 221 and the actual motor speed (Nm) based on the registered value of the rotational speed sensor 10, and outputs the deviation to the control block 223.

The control block 223 calculates a torque command value ($T'_{m2}$*) from a transfer characteristic H(s)/Gp(s) model on the basis of the deviation calculated by the subtracter 222. H(s) acts as a feedback element for reducing only vibration, and is formed from a band pass filter, for example. The band pass filter treats the torsion frequency of the drive system as a passband median frequency.

The adder 224 calculates the post-damping-control torque command value ($T_{m2}$*) by adding a torque command value ($T'_{m1}$*) and the torque command value ($T'_{m2}$*), and outputs this value to the current control unit 23.

The damping control unit 22 thereby registers vibration produced by torsion or the like of the drive shaft 5, counteracts the torsion by feedback compensation, and suppresses vibration. For the model formulas of Gp(s) and H(s) and the detailed control specifics of the damping control unit 22, please refer to Japanese Laid-open Patent Application No. 2003-9566.

On the basis of the torque command value ($T_{m1}$*) set by the motor torque control unit, the control block 225 calculates the post-compensation torque command value ($T_{m1}$*) from a transfer characteristic Gm(s) model. Gm(s) is a model expressed by the following formula (1).

[Eq. 1]

$$Gm(s) = \frac{Gr(s)}{Gp(s)} = \frac{s^2 + 2\zeta_p\omega_p s + \omega_p^2}{s^2 + 2\omega_p s + \omega_p^2} \quad (1)$$

[Eq. 2]

$$Gp(s) = \frac{1}{s} \cdot \frac{(s+b_3)(b_2 s^2 + b_1 s + b_0)}{(s+a)(s^2 + 2\zeta_p\omega_p s + \omega_p^2)} \quad (2)$$

Gr(s) represents an ideal characteristic in the absence of torsional vibration, the input being motor torque and the output being motor speed. The symbol $\zeta_p$ represents a polar damping constant of the model Gp(s) shown in formula (2). The symbol $\omega_p$ represents a natural frequency of the model Gp(s) shown in formula (2). The symbols a, $b_0$, $b_1$, $b_2$, and $b_3$ of formula (2) are coefficients for expressing the model formula.

The configuration and control of the damping control unit 22 are not limited to what is described above, and there are other alternatives for this configuration and control.

Figure 4:
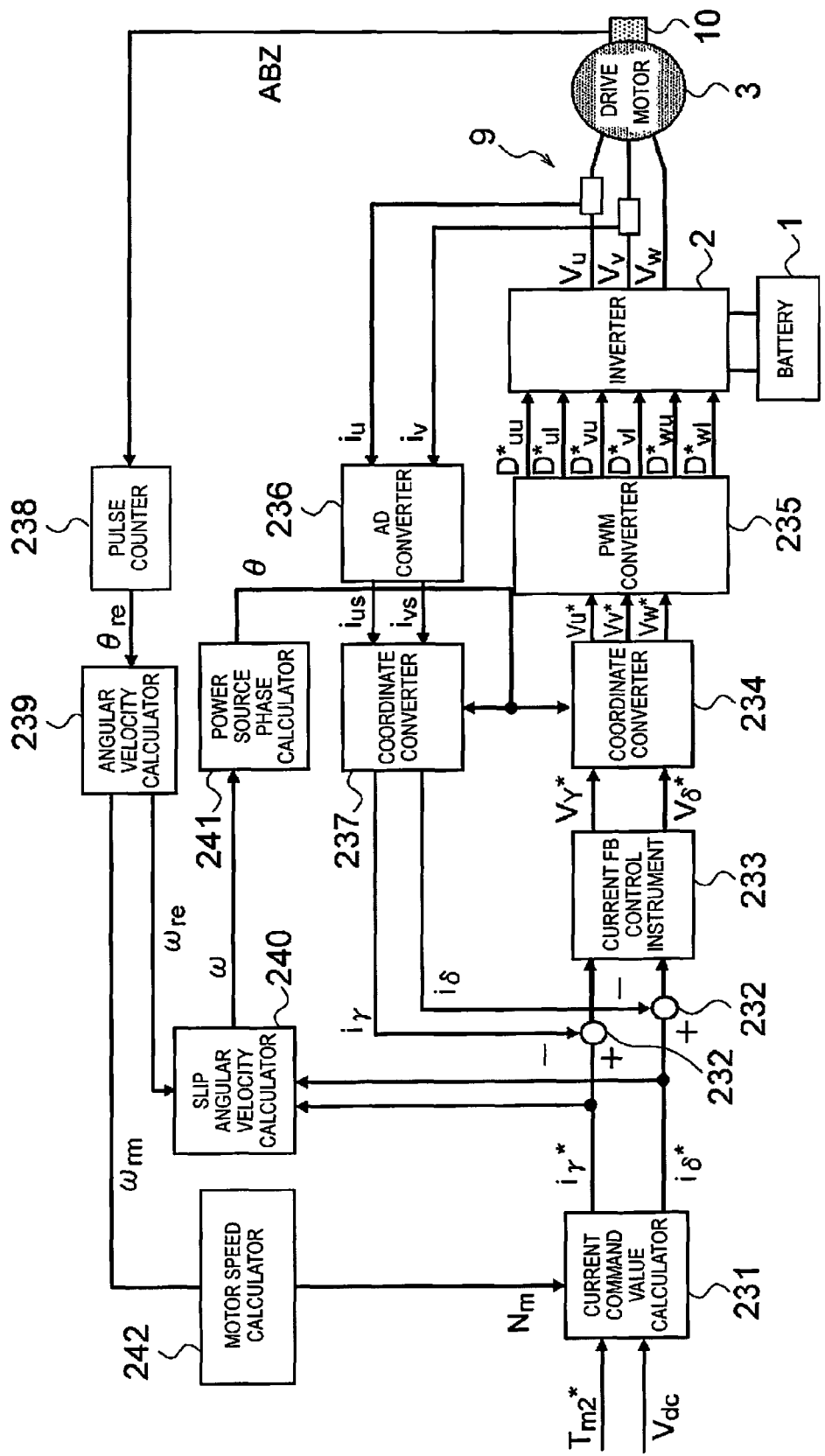
FIG. 4 is a block diagram current control unit of FIG. 1.

Next, FIG. 4 is used to describe the configuration and control specifics of the current control unit 23. FIG. 4 is a block diagram showing the configuration of the current control unit 23.

The current control unit 23 has a current command value calculator 231, subtracters 232, a current FB control instrument 233, a coordinate converter 234, a PWM converter 235, an AD converter 236, a coordinate converter 237, a pulse counter 238, an angular velocity calculator 239, a slip angular velocity calculator 240, a power source phase calculator 241, and a motor speed calculator 242.

The torque command value ($T_{m2}*$) inputted from the damping control unit 22, the rotational speed ($N_m$) of the drive motor 3 inputted from the motor speed calculator 242, and the voltage ($V_{dc}$) registered by the voltage sensor 8 are inputted to the current command value calculator 231, and the calculator calculates and outputs γδ-axes current command values ($i_\gamma*$, $i_\delta*$). The γδ-axes represent components of the rotation coordinate system. Stored in advance in the current command value calculator 231 is a map showing the relationship of the γδ-axes current command values ($i_\gamma*$, $i_\delta*$) to the torque command value ($T_{m2}*$), the voltage ($V_{dc}$) of the battery 1, and the motor speed ($N_m$). Therefore, the current command value calculator 231 calculates the γδ-axes current command values ($i_\gamma*$, $i_\delta*$) by referring to the map for the inputs, and outputs the values to the subtracters 232.

The subtracters 232 calculate deviations between the γδ-axes current command values ($i_\gamma*$, $i_\delta*$) and γδ-axes currents ($i_\gamma$, $i_\delta$), and output the deviations to the current FB control instrument 233. The current FB control instrument 233 is a control instrument which controls feedback so that the γ-axis current ($i_\gamma$) and the δ-axis current ($i_\delta$) match the γ-axis current command value ($i_\gamma$•) and the δ-axis current command value ($i_\delta*$), respectively. The current FB control instrument 233 performs control calculations so that the γδ-axes currents ($i_\gamma$, $i_\delta$) match the γδ-axes current command values ($i_\gamma*$, $i_\delta*$) with designated responsiveness and without steady deviation, and outputs γδ-axes voltage command values ($v_\gamma*$, $v_\delta*$) to the coordinate converter 234. The γ-axis current is the excitation current of the drive motor 3, and the δ-axis current is the torque current of the drive motor 3. Decoupling control may be added to the controls of the subtracters 232 and the current FB control instrument 233.

With the γδ-axes voltage command values ($v_\gamma*$, $v_\delta*$) and a power source phase (θ) calculated by the power source phase calculator 241 as inputs, the coordinate converter 234 converts the γδ-axes voltage command values ($v_\gamma*$, $v_\delta*$) to voltage command values ($v_u*$, $v_v*$, $v_w*$) of u-, v-, and w-axes of a fixed coordinate system, and outputs these values to the PWM converter 235.

The PWM converter 235 creates switching signals ($D*_{uu}$, $D*_{ul}$, $D*_{vu}$, $D*_{vl}$, $D*_{wu}$, $D*_{wl}$) for the switching elements of the inverter 2 on the basis of the inputted voltage command values ($v_u*$, $v_v*$, $v_w*$), and outputs these signals to the inverter 2.

The AD converter 236 samples phase currents ($i_u$, $i_v$) which are values registered by the current sensor 9, and outputs sampled phase currents ($i_{us}$, $i_{vs}$) to the coordinate converter 237. Because the sum total of the current values of the three phases is zero, a w-phase current is not registered by the current sensor 9, but instead, the coordinate converter 237 calculates a w-phase current ($i_{ws}$) on the basis of the inputted phase currents ($i_{us}$, $i_{vs}$). For the w-phase current, the current sensor 9 is provided in the w-phase, and the w-phase current is registered by the current sensor 9.

The coordinate converter 237 is a converter for converting three phases to two, and this converter uses the power source phase (θ) to convert the phase currents ($i_{us}$, $i_{vs}$, $i_{ws}$) of the fixed coordinate system to γδ-axes currents ($i_{\gamma s}$, $i_{\delta s}$) of the rotation coordinate system, and outputs these currents to the subtracters 232. The current values registered by the current sensor 9 are thereby fed back.

The pulse counter 238 acquires a rotator phase ($θ_{re}$) (an electric angle), which is information on the position of the rotator of the drive motor 3, by counting the pulses outputted from the rotational speed sensor 10, and outputs this phase to the angular velocity calculator 239.

The angular velocity calculator 239 calculates rotational angular velocity ($ω_{re}$) (an electric angle) by differentially calculating the rotator phase ($θ_{re}$), and outputs this velocity to the slip angular velocity calculator 240. The angular velocity calculator 239 also divides the calculated rotational angular velocity ($ω_{re}$) by the number of pole pairs p of the drive motor 3, calculates a rotator mechanical angular velocity ($ω_{rm}$) [rad/s] which is the mechanical angular velocity of the motor, and outputs this velocity to the motor speed calculator 242.

The slip angular velocity calculator 240 calculates slip angular velocity ($ω_{se}$) determined from the γδ-axes current command values ($i_\delta*$, $i_\gamma*$) and a motor constant, calculates a power source angular velocity (ω) by adding the slip angular velocity ($ω_{se}$) to the rotator angular velocity ($ω_{re}$), and outputs the power source angular velocity to the power source phase calculator 241.

The slip angular velocity ($ω_{se}$) is calculated by first calculating a rotor magnetic flux estimated value $φ_{est}$ which accounts for rotor magnetic flux response lag relative to the excitation current command value ($i_\gamma*$) (using the formula (3) described hereinafter), and multiplying a motor constant M·Rr/Lr (M: phase inductance, Rr: rotor resistance, Lr: rotor self-inductance) by the ratio of the torque current command value ($i_\delta*$) to the rotor magnetic flux estimated value $φ_{est}$ ($i_\delta*/φ_{est}$). Due to the slip angular velocity ($ω_{se}$) being set in this manner, the output torque is handled as a product of torque current and rotor magnetic flux.

The motor speed calculator 242 calculates the motor speed ($N_m$) by multiplying the rotator mechanical angular velocity ($ω_{rm}$) by a coefficient (60/2π) for converting from units of [rad/s] to units of [rpm], and outputs the motor speed to the current command value calculator 231. The motor speed ($N_m$) is also outputted to the motor torque control unit and the damping control unit 22.

Through control such as is described above, the motor controller 20 controls the inverter 2 and drives the drive motor 3 on the basis of the inputted vehicle information. The motor controller 20 also suppresses vibration caused by disturbances and the like through the control of the damping control unit 22.

A case is described in which a vibration component of the drive system such as torsion in the drive shaft 5 is removed by a feedback control process alone, such as is shown in FIG. 2. In such a case, when the rotor of the drive motor 3 has been excited at the point in time vibration occurs while the vehicle is traveling, the above-described feedback control makes it possible for the damping torque current to be raised with high responsiveness by inputting the post-damping-control torque command value to the current control unit 23. Therefore, a damping action can be exhibited in damping control while the vehicle is traveling, by the feedback control process alone (the normal control alone) shown in FIG. 2.

However, a sufficient damping action in response to vibration caused by park lock release shock cannot be achieved by the feedback control process alone shown in FIG. 2. Park lock release shock occurs when, for example, the shift lever is set in the parking range and the vehicle stops without the parking brake being applied. In this case, because the shift lever is set in the parking range, the torque command value is zero and the vehicle is also stopped. Therefore, excitation current is channeled to the drive motor 3 in conventional damping control.

The drive motor 3 commonly does not have good torque response relative to the inputted current. Therefore, setting the shift lever out of parking causes the lock to be released by the lock mechanism 11, after which the vibration of park lock release shock is registered by the current sensor 9, the feedback control process shown in FIG. 2 is performed, and even though the torque current•excitation current is set relative to the torque command value, the vibration cannot be suppressed because the rotor magnetic flux response is slow.

Figure 5:
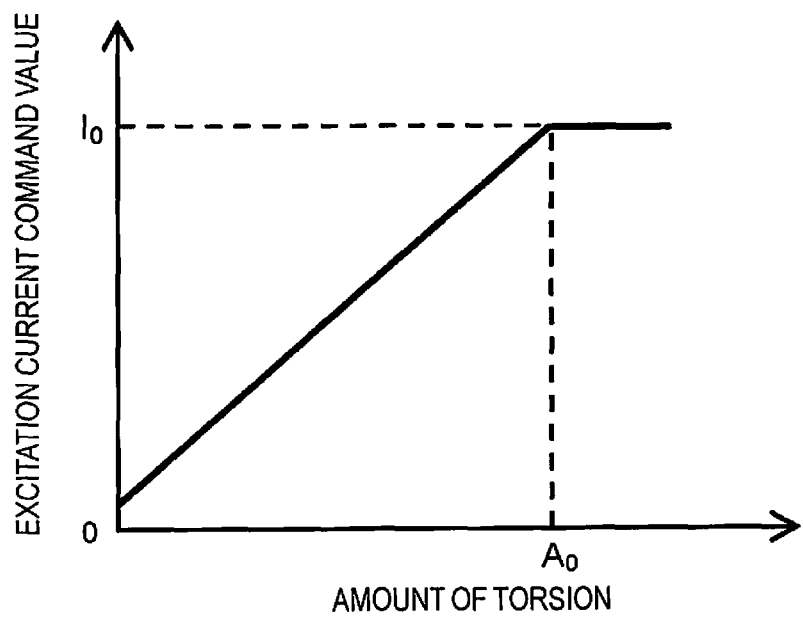
FIG. 5 is a graph for describing map referenced by current control unit, showing relationship of γ-axis current command value (excitation current command value) to amount of torsion.

In the present example, the vibration of park lock release shock is suppressed by the control process described below. FIGS. 1, 4, and 5 are used to describe the control of the current control unit 23 for suppressing the vibration of park lock release shock. FIG. 5 is a graph showing the relationship of the γ-axis current command value ($i_\gamma^*$) (the excitation current command value) to the amount of torsion.

As an input process, the motor controller 20 receives a signal including shift lever position information, information on the parking release switch of the shift lever, brake switch information, or the like, and a signal including vehicle information, from another controller. The motor controller 20 also acquires slope information from a slope sensor (not shown).

From the received information described above, the current control unit 23 determines whether or not the shift lever position is the parking position. When the shift lever has been set to the parking position, the lock mechanism 11 operates and there is a possibility that the drive shaft 5 has twisted. Therefore, when the shift lever has been set to the parking position, the current control unit 23 calculates the amount of torsion in the drive shaft 5.

The gain of the amount of torsion relative to the slope information is set in advance in the current control unit 23. The current control unit 23 estimates the amount of torsion by applying this gain to the size of the slope included in the slope information.

Next, the current control unit 23 refers to the map shown in FIG. 5 to calculate the γ-axis current command value ($i_\gamma^*$) corresponding to the estimated amount of torsion. The excitation current command value (the γ-axis current command value ($i_\gamma^*$)) shown in FIG. 5, which is associated with the amount of torsion in the drive shaft 5, is a command value of the excitation current needed to suppress the vibration of park lock release shock based on the amount of torsion. The relationship between the amount of torsion and the excitation current command value shown in FIG. 5 is preferably calculated, e.g., by computing or experimenting.

Concerning the relationship between the amount of torsion and the excitation current command value, as the amount of torsion increases from zero, the excitation current command value increases proportionately, and when the amount of torsion is equal to or greater than a designated value ($A_0$), the excitation current command value remains at a constant value (Io). The excitation current command value is a command value for exciting the rotor of the drive motor 3 in advance, after a release of the lock mechanism 11 has been detected by the lock release detection unit 13 and before the lock is actually released by the lock mechanism 11.

The excitation current (Io) corresponding to the command value is the current allowed when control is performed for suppressing vibration due to park lock release shock (the control when the lock mechanism 11 is released). The excitation current command value of FIG. 5 is the command value of current channeled to the drive motor 3 before the lock of the lock mechanism 11 is actually released and while the torque is zero.

When current is channeled while the torque is zero, the current concentrated to a specific phase of the inverter 2. In a steady state, however, the current flows in roughly equal measure to all phases of the inverter 2 when the torque is not zero and the drive motor 3 is rotating.

To protect the switching elements or diodes (referred to below collectively as the semiconductor elements) constituting the inverter 2 from heat, an allowable current value, in other words a maximum command value (rated command value) that can be conducted to the semiconductor elements is set in advance.

Because current is channeled in roughly equal measure to the semiconductor elements of the inverter 2 when the drive motor 3 is rotating, the excitation current can be increased. When the drive motor 3 is not rotating, current is channeled to semiconductor elements of a specific phase of the inverter 2, and the overall excitation current must be lowered in order to protect these semiconductor elements. Specifically, between the excitation current ($I_1$) whereby the current channeled to the semiconductor elements is made equal to or less than the allowable current when the drive motor 3 is not rotating and the excitation current ($I_2$) whereby the current channeled to the semiconductor elements is made equal to or less than the allowable current when the drive motor 3 is rotating, the relationship is $I_2 > I_1$.

The excitation current ($I_0$) shown in FIG. 5 indicates the allowable current value of the excitation current when the drive motor 3 is not rotating, and the upper limit of the excitation current ($I_0$), which is lower than the excitation current ($I_2$), is set to a current range equal to or less than the excitation current ($I_1$).

The current control unit 23 thereby calculates the γ-axis current command value ($i_\gamma^*$) (the excitation current command value) on the basis of the registered value of the slope sensor. The current control unit 23 also allows the upper limit value of the excitation current outputted in accordance with the γ-axis current command value ($i_\gamma^*$) to be as much as the excitation current ($I_1$), but sets the upper limit value to the excitation current ($I_2$) or less when the park lock is released.

By means of a first timer, the current control unit 23 manages the state of control for suppressing the vibration of park lock release shock. A set time ($T_1$) is set as a time indicating a time-out of vibration suppression control in the current control unit 23.

From the time when a signal indicating that the lock mechanism 11 has been released is received from the lock release detection unit 13 (the lock mechanism 11 has not performed the release operation at this point in time as will be described hereinafter), the current control unit 23 uses the first timer to initiate a countdown from the set time ($T_1$). When the value of the first timer is greater than zero, the current control unit 23 performs control for suppressing the vibration of park lock release shock. When the first timer reaches zero, the current control unit 23 ends control for suppressing the vibration of park lock release shock.

Upon receiving a lock release signal from the lock release detection unit 13, the current control unit 23 controls the current command value calculator 231 so that a γ-axis current command value ($i_\gamma^*$) calculated from the map of FIG. 5 is outputted to the subtracters 232, and controls the inverter 2 on the basis of the γ-axis current command value ($i_\gamma^*$). At this time, a σ-axis current command value ($i_o^*$) is zero. Excitation current is thereby channeled to the rotor of the drive motor 3 before the lock of the lock mechanism 11 is released, and the rotor is excited.

A rising time ($T_2$) for the rotor excitation to rise is set in advance in the current control unit 23, in relation to the input of the γ-axis current command value ($i_\gamma$*) described above. The rising time ($T_2$) is a time equal to or greater than a response time constant ($\tau_\phi$) of the rotor magnetic flux relative to the excitation current. The drive motor 3 does not have good torque response relative to the input current. Therefore, when the lock mechanism 11 is released immediately after the inverter 2 is controlled with the γ-axis current command value ($i_\gamma$*), there is a risk that the drive shaft 5 will rotate while the rotor of the drive motor 3 is not yet sufficiently excited, and that the vibration caused by park lock release shock will not be sufficiently suppressed.

The current control unit 23 uses the first timer to initiate a countdown from a set time ($T_1$) from the time when the lock release signal is received. When the time measured by the first timer reaches a time equal to $T_1-T_2$, or in other words, when the rising time ($T_2$) has elapsed from the time when the lock release signal is received, the current control unit 23 sends a control signal to the lock mechanism control unit 12 to release the lock mechanism 11. The lock mechanism control unit 12 then operates the lock mechanism 11 on the basis of this control signal and causes the lock mechanism 11 to release the lock. The rotor of the drive motor 3 is thereby sufficiently excited at the time of the operation of releasing the lock of the lock mechanism 11. The vibration of the park lock release shock is suppressed due to the torque current, described hereinafter, flowing to the drive motor 3.

When the lock of the lock mechanism 11 is released, the torsion in the drive shaft 5 is dispelled, and the drive system would vibrate but a torque command value ($T_{m2}$*) for suppressing vibration caused by torsion is calculated by the damping control unit 22 and damping control is performed. The current control unit 23 calculates the σ-axis current command value ($i_\sigma$*) for channeling torque current from this torque command value ($T_{m2}$*) and the rotor magnetic flux estimated value based on the γ-axis current command value ($i_\gamma$*).

The rotor magnetic flux estimated value ($\phi_{est}$) is calculated from the following formula (3), using the γ-axis current command value ($i_\gamma$*) and taking into account the responsiveness of the rotor magnetic flux.

[Eq. 3]

$$\phi_{est} = \frac{M}{\tau_\phi + 1} i_\gamma^* \quad (3)$$

The σ-axis current command value ($i_\sigma$*) is calculated by dividing the torque command value ($T_{m2}$*) by the product of the rotor magnetic flux estimated value ($\phi_{est}$) and a gain ($K_{Te}$), and multiplying the result by the γ-axis current command value ($i_\gamma$*).

[Eq. 4]

$$i_\sigma^* = \frac{T_{m2}^*}{K_{Te} \cdot \phi_{est}} i_r^* \quad (4)$$

The gain ($K_{Te}$) is expressed by the following formula (5).

[Eq. 5]

$$K_{Te} = \frac{pM}{L_r} \quad (5)$$

M here represents the mutual inductance of the drive motor 3, and $\tau_\phi$ represents the response time constant of the rotor magnetic flux. $\tau_\phi$ is expressed as $L_r/R_r$. $L_r$ is the self-inductance of the rotor, and $R_r$ is the rotor resistance.

$\tau_\phi$ is equivalent to the magnetic flux response lag time of the drive motor 3. In formula (5), $\tau_\phi$ may be the current response lag time of the drive motor 3. The mutual inductance (M), the time constant ($\tau_\phi$), and the gain ($K_{Te}$) may be calculated by referring to a table showing values of rotor temperatures, current values, and torque command values calculated in advance by computations or experiments.

When the δ-axis current command value ($i_\sigma$*) described above is calculated by the current command value calculator 231, the current control unit 23 outputs the σ-axis current command value ($i_\sigma$*) to the subtracters 232 and controls the inverter 2 via the current FB control instrument 233 and other components. For the γ-axis, the current control unit 23 maintains the γ-axis current command value ($i_\gamma$*), which had been calculated before the lock release, even after the lock release, and outputs this command value from the current command value calculator 231 to the subtracters 232 to control the inverter 2.

The current control unit 23 thereby channels the torque current of the drive motor 3 on the basis of the σ-axis current command value ($i_\sigma$*) after the lock of the lock mechanism 11 has been released. The rotor of the drive motor 3 is then excited when the torque current is conducted, and the vibration from the park lock release shock is suppressed.

The damping control of the present example ends when the time ($T_1$) set by the first timer reaches zero. As will be described below, the present example is designed such that during damping control, whether or not vibration has been suppressed by damping control is detected without the set time ($T_1$) having reached zero. Damping control then ends when the suppression of vibration has been detected.

Two conditions are prepared in order to determine whether or not vibration has been suppressed. The first condition is a condition stipulated by the rotational speed of the drive motor 3 and the torque command value ($T_{m2}$*), and the condition is that the rotational speed (Nm) of the drive motor 3 be lower than a rotational speed threshold (No) and that the torque command value ($T_{m2}$*) be zero. The current control unit 23 determines whether or not the rotational speed (Nm) based on the registered value of the rotational speed sensor 10 and the torque command value ($T_{m2}$*) calculated by the damping control unit 22 satisfy the first condition.

The second condition is that the time elapsed since the satisfying of the first condition has reached a designated set time ($T_3$). Specifically, due to the first condition being satisfied, the current control unit 23 performs a time-elapse process by performing a determination based on the second condition after having determined that there is a possibility that vibration has been suppressed.

The current control unit 23 has a second timer for determining the second condition. When the current control unit 23 determines that the first condition is satisfied, the current control unit uses the second timer to count up from zero. When the value of the second timer has reached the set time ($T_3$), the current control unit 23 determines that the second condition is also satisfied and determines that vibration has been suppressed.

When it is determined that vibration has been suppressed, the current control unit 23 resets the count values of the first timer and second timer, ends damping control, and returns to normal control.

In normal control, while the torque command value ($T_{m2}$*) is zero, the current control unit 23 calculates a current command value in accordance with the externally requested torque, without calculating a γ-axis current command value ($i_\gamma^*$) that would channel unintended excitation current. Therefore, if the state is not transitory, the γ-axis current command value ($i_\gamma^*$) during normal control will be lower than the γδ-axes during control for damping the vibration of park lock release shock.

Consequently, when the suppression of vibration is detected, the current control unit 23 causes the excitation current after the end of damping control to be lower than the excitation current during damping control. The excitation current thereby decreases when the suppression of vibration from park lock release shock ends, the amount of current consumed can therefore be reduced, and the amount of the battery 1 consumed can be suppressed.

Furthermore, in the present example, a vibration suppression detection timing, which is the timing at which the excitation current is lowered, is advanced ahead of the point in time when the set time ($T_1$) elapses by providing the first and second conditions. Therefore, in the present example, the amount of current consumed can be reduced and the amount of the battery 1 consumed can be suppressed in comparison with cases in which a high excitation current is channeled until the set time ($T_1$) elapses.

In the present example, when the vehicle is in a state in which vibration occurs due to park lock release shock, damping control for suppressing the vibration caused by this shock is performed when it is detected that the lock mechanism 11 has been released by the lock release detection unit 13. Control is then switched to normal inverter control after damping control ends.

Figure 6:
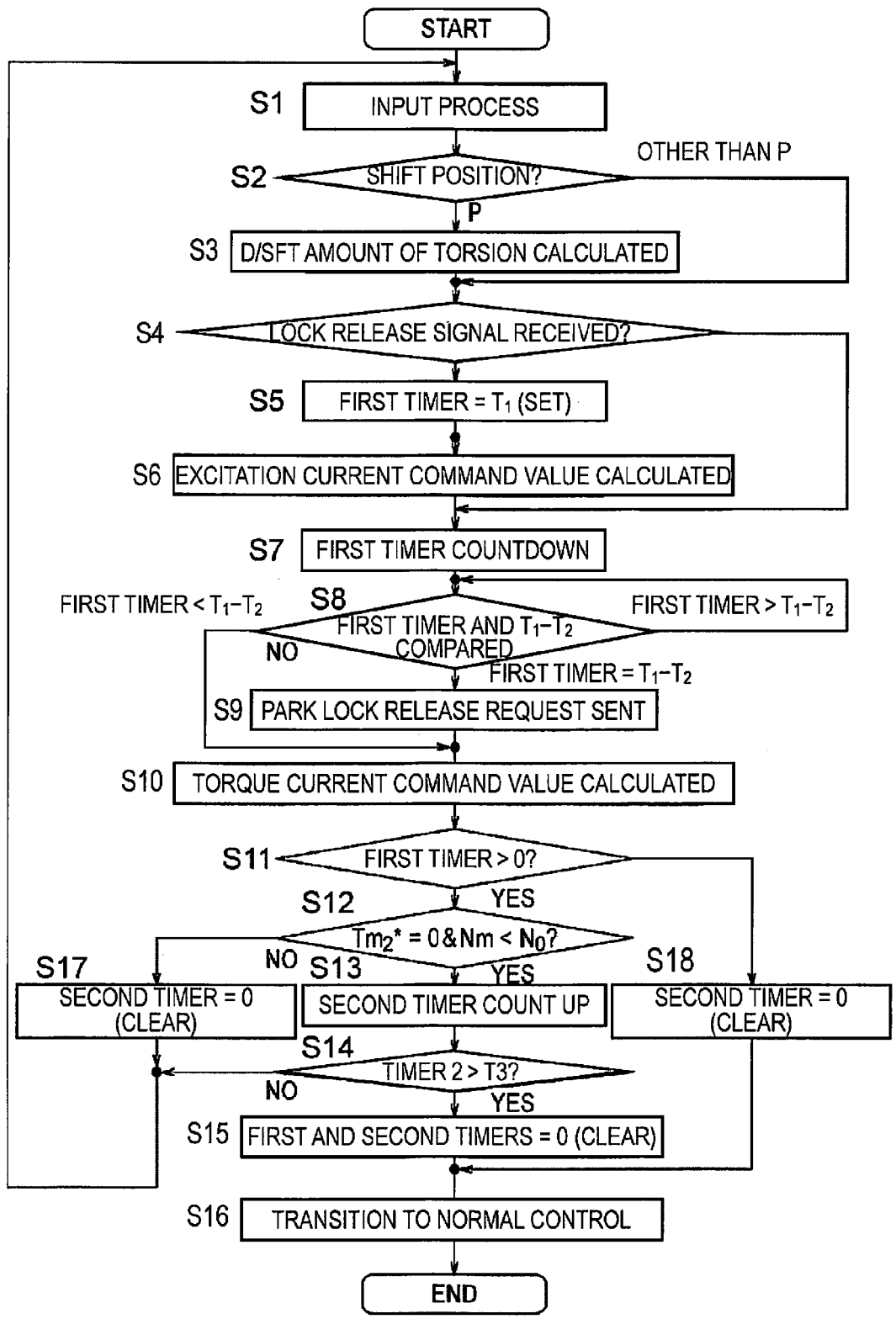
FIG. 6 is a flowchart showing control procedure of motor controller of FIG. 1.

Next, FIG. 6 is used to describe the flow of the control process of the motor controller 20. FIG. 6 is a flowchart showing the control procedure of the motor controller 20.

In step 1, as an input process, the motor controller 20 receives a signal including information such as shift lever position information. In step 2, the motor controller 20 extracts the shift lever position information from the information acquired in step 1, and determines whether or not the shift lever has been set to the parking position.

When the shift lever position is the parking position, the current control unit 23 calculates the amount of torsion in the drive shaft (D/SFT) 5 by using, for example, the value detected by the slope sensor from within the information acquired in battery 1. Returning to step 2, when the shift lever position is a position other than parking, the process transitions to step 4.

In step 4, the motor controller 20 determines whether or not a signal from the lock release detection unit 13 has been received. When a signal that the lock mechanism 11 will be released has been received, the current control unit 23 sets the first timer to the set time ($T_1$) (step 5).

In step 6, the current control unit 23 uses the amount of torsion calculated in step 3 and refers to the relationship map shown in FIG. 5 to calculate the excitation current command value (γ-axis current command value ($i_\gamma^*$)) at the time of the park lock release. The inverter 2 is then controlled on the basis of this excitation current command value, and excitation current flows to the drive motor 3. In step 7, the current control unit 23 uses the first timer to initiate a countdown from the set time ($T_1$).

In step 8, the current control unit 23 compares the value measured by the first timer and the time indicating the threshold ($T_1$-$T_2$). When the measured value is greater than $T_1$-$T_2$, the control process of step 8 is repeated. When the value measured by the first timer reaches $T_1$-$T_2$, in step S9, the current control unit 23 sends a request signal to the lock mechanism control unit 12 to release the lock of the lock mechanism 11. The lock mechanism control unit 12 receives the request signal and operates the lock mechanism 11, and the process transitions to step 10.

When the value measured by the first timer is less than $T_1$-$T_2$, because the lock release request signal has already been sent, the process transitions to step 10 without a request signal for the lock mechanism 11 being sent in step 9.

In step 10, the current control unit 23 calculates a torque current command value (σ-axis current command value ($i_\sigma^*$)) on the basis of the torque command value ($T_{m2}^*$) from the damping control unit 22. The inverter 2 is controlled on the basis of this torque current command value and the excitation current command value calculated in step 6, and torque current also flows to the drive motor 3.

In step 11, the current control unit 23 determines whether or not the value measured by the first timer has reached zero. When the value measured by the first timer is not zero, in step S12, the current control unit 23 determines whether or not the torque command value ($T_{m2}^*$) is zero and the motor speed (Nm) is lower than the rotational speed threshold (No).

When the torque command value ($T_{m2}^*$) is zero and the motor speed (Nm) is lower than the rotational speed threshold (No), in step 13, the current control unit 23 counts the value of the second timer up from zero. In step 14, the current control unit 23 determines whether or not the value measured by the second timer is greater than the set time ($T_3$).

When the value measured by the second timer is greater than the set time ($T_3$), the current control unit 23 determines that the vibration from park lock release shock has been suppressed, and resets the values of the first timer and the second timer (step S15). In step 16, the current control unit 23 ends the damping control for the vibration of park lock release shock, switches to normal inverter control, and ends the control of the present example.

Returning to step 14, when the value measured by the second timer is equal to or less than the set time ($T_3$), an assessment is made that control for damping the vibration of park lock release shock is in effect, and the process returns to step 1.

Returning to step 12, when the torque command value ($T_{m2}^*$) is not zero, or when the motor speed (Nm) is equal to or greater than the rotational speed threshold (No), the value of the second timer is reset in step 17. In step S12, once the torque command value ($T_{m2}^*$) is zero and after the motor speed (Nm) has been determined to be lower than the rotational speed threshold (No), damping control must be continued when the torque command value ($T_{m2}^*$) or the motor speed (Nm) has increased during the counting up of the second timer. Therefore, in such cases, the second timer is reset in step S17, the process returns to step 1, and damping control continues.

Returning to step 11, when the value measured by the first timer has reached zero, the current control unit 23 determines that the vibration from park lock release shock has been suppressed, resets the second timer in step 18, and transitions to step 16.

Returning to step 4, when a signal from the lock release detection unit 13 has already been received, the process transitions to step S7, and damping control continues while the value of the first timer is counted down.

Figure 7:
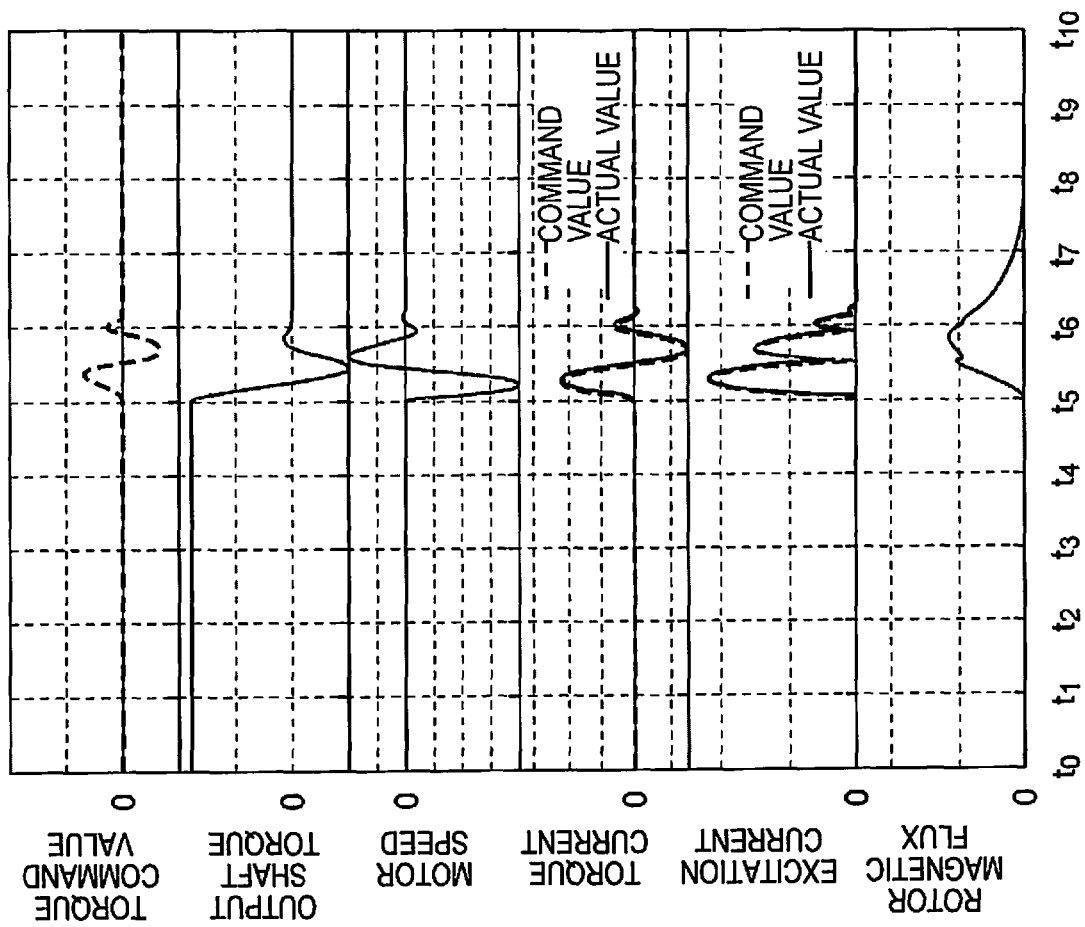
Figure 8:
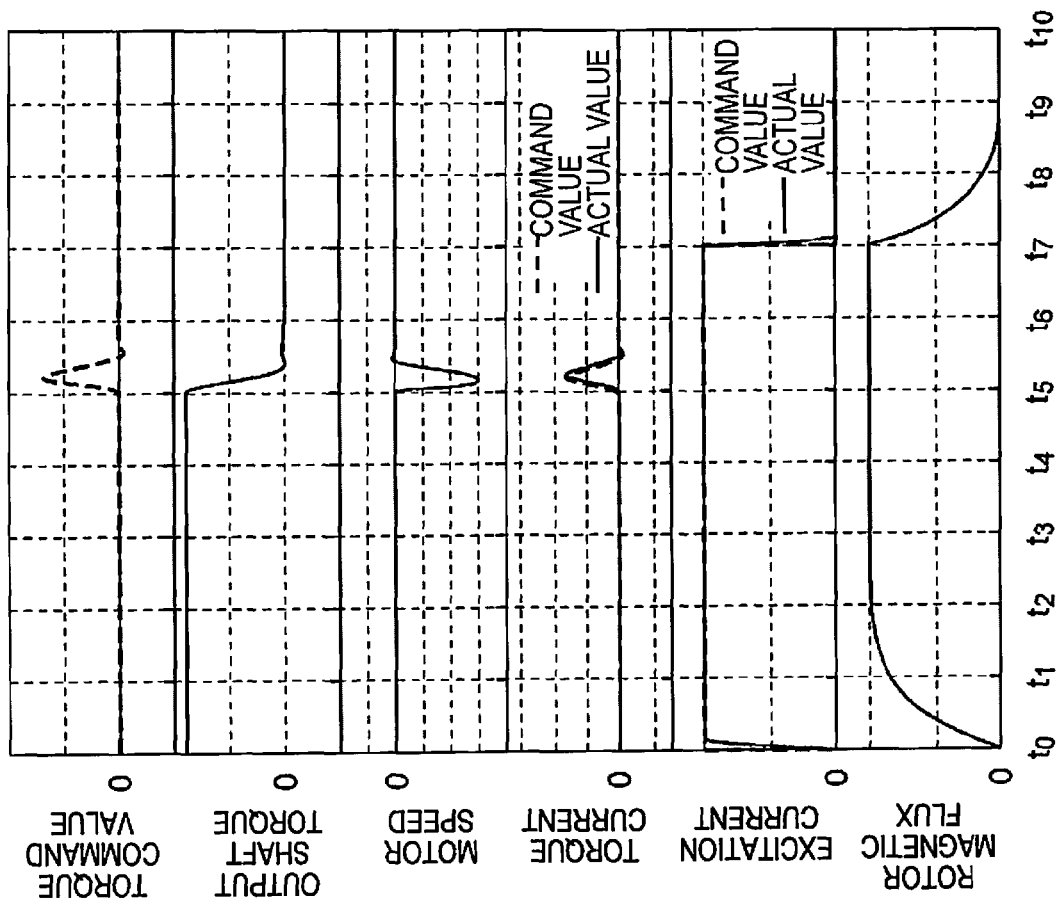

Next, the effects of the motor control device according to the present invention will be described using FIGS. 7 and 8. FIGS. 7 and 8 are graphs wherein (a) shows the characteristics of the torque command value ($T_{m2}^*$), (b) shows the torque characteristics of the output shaft, (c) shows the characteristics of the motor speed, (d) shows the characteristics of the torque current of the drive motor 3, (e) shows the characteristics of the excitation current of the drive motor 3, and (f) shows the characteristics of the rotor magnetic flux. FIG. 7 shows characteristics of a comparative example, FIG. 8 shows characteristics of the present invention, the dashed lines in FIGS. 7 and 8 represent command values, and the solid lines represent actual values. The horizontal axes represent time.

In the motor control device according to the comparative example, control for damping vibration from park lock release shock is not performed by the current control unit 23. The conditions of the characteristics of the comparative example and the present invention are that the park lock be applied (the lock be applied by the lock mechanism 11) with the shift lever position in the parking position after the vehicle has been parked on an upward hill, and the vehicle be stopped with the brake released and the drive shaft 5 under torsion. The following is a description of a case in which the brake is pressed and the lock mechanism 11 is released in order to start the vehicle off again at this time.

First, the comparative example will be described. At time $t_0$, a release of the lock mechanism 11 is detected. At this time, the torque command value is zero, and the excitation current is in a state of zero. The torque of the output shaft shows a value higher than zero due to the torsion in the drive shaft 5. The torque of the output shaft is a value according to the mass of the vehicle and the size of the slope.

At time $t_5$, when the lock of the lock mechanism 11 has actually been released, the torsion in the drive shaft 5 is dispelled and the torque of the output shaft decreases toward zero, but the motor speed decreases due to the effect of counterforce against the torque decrease.

The torque command value is raised by the damping control of the damping control unit 22 in response to the decrease in motor speed, but the rotor magnetic flux response to the excitation current is slow even though the command value equivalent to the torque command value is raised and the excitation current and torque current are channeled. Specifically, the excitation current and the torque current rise quickly from the point in time at time $t_5$ as shown in (d) and (e) of FIG. 7, but the rise in the rotor magnetic flux is slow.

Therefore, in the comparative example, it is not possible for torque equal to the torque command value to be outputted from the drive motor 3. As a result, the torque of the output shaft overshoots (refer to the characteristics from time $t_5$ to $t_6$ in FIG. 7(b)), and in the comparative example, the vibration from park lock release shock cannot be suppressed and the vehicle occupant experiences unpleasant vibration.

In the present invention, when a release of the lock mechanism 11 is detected at time $t_0$, the excitation current rises and the rotor magnetic flux therefore also increases. At this time, the rising rate of the rotor magnetic flux is slower than the rising rate of the excitation current, but until time $t_5$, there is sufficient guarantee of time for the rotor magnetic field to be sufficiently excited. Therefore, the rotor magnetic flux has sufficiently risen by time $t_5$.

At time $t_5$, when the lock of the lock mechanism 11 is actually been released, damping control by the damping control unit 22 functions in the same manner as in the comparative example, and the torque command value rises so that the vibration of park lock release shock is suppressed.

At this time, in the present invention, the rotor magnetic flux has been excited by time $t_5$, the current control unit 23 therefore raises the torque current while maintaining the excitation current, and torque matching the torque command value of the damping control unit 22 can thereby be outputted.

As a result, in the present invention, overshooting of the torque of the output shaft is suppressed (refer to the characteristics of time $t_5$ to $t_6$ in FIG. 8(b)), and vibration is completely suppressed by time $t_6$. Furthermore, in the present invention, the excitation current can be lowered to the same current value as that of normal control in correspondence with the torque command value of zero, and the amount of the battery 1 consumed can therefore be suppressed.

As described above, in the present invention, the excitation current is increased in conformity with the timing at which the lock of the lock mechanism 11 is released and the rotor magnetic flux is excited in advance, whereby torque responsiveness to the torque command value can be improved and the vibration from park lock release shock can be suppressed. After the vibration of park lock release shock has been suppressed, the amount of the battery 1 consumed can be suppressed by quickly lowering the excitation current to a normal control value.

As described above, in the present example, an excitation current for generating a magnetic flux in the drive motor 3 is channeled on the basis of the detection result of the lock release detection unit 13. An excitation current is thereby channeled in conformity with the release of the lock mechanism 11 and the rotor magnetic flux (field) can be raised, the responsiveness of damping torque to the vibration of park lock release shock can therefore be increased, and torsional vibration of the drive shaft can be suppressed. Because the excitation current is channeled in conformity with the release of the lock mechanism 11, there is no need for current to be channeled constantly, and the amount of the battery 1 consumed can be suppressed.

In the present example, when the lock release detection unit 13 detects that the lock mechanism 11 has been released, the excitation current is channeled before the lock release of the lock mechanism 11. The rotor can thereby be excited before the lock mechanism 11 operates, the responsiveness of damping torque to the vibration of park lock release shock can therefore be increased, and the vibration can be suppressed.

In the present example, the excitation current is allowed to reach an excitation current ($I_1$) (equivalent to the "first excitation current" of the present invention). It is thereby possible to lessen the possibility of damage to the semiconductor elements included in the inverter 2 when the drive motor 3 is not rotating. The elements included in circuits such as a converter can be similarly protected also in cases in which a winding field motor is applied as the drive motor.

In the present example, during control for damping the vibration of park lock release shock, the upper limit of the excitation current is set to an excitation current ($I_1$) lower than the excitation current ($I_2$) (equivalent to the "second excitation current" of the present invention). It is thereby possible to lessen the possibility of damage to the semiconductor elements included in the inverter 2 when the drive motor 3 is not rotating.

In the present example, after the lock of the lock mechanism 11 has been released, the torque current of the drive motor 3 is channeled on the basis of the torque command value ($T_{m2}^*$). The timing at which the torque current is channeled can thereby be matched to the timing at which the lock mechanism 11 actually operates, and it is thereby possible to suppress the amount of the battery 1 consumed while suppressing the vibration from park lock release shock.

Releasing the lock mechanism 11 causes the torsion in the drive shaft 5 to be dispelled and a rotational speed to be generated, and there is therefore no need for feedback torque in order to suppress the vibration from the dispelling of torsion. In the present example, as described above, the torque current can be actively increased after the lock is released by channeling the torque current after the lock is released, and high torque response can be achieved. As a result, vibration can be suppressed.

In the present example, after the lock is released, the excitation current that had been channeled before the releasing of the lock mechanism 11 is kept constant. The excited state of the rotor is thereby maintained when the torque current is channeled after the lock is released, and a high torque response can therefore be achieved. As a result, vibration can be suppressed.

When great torque is applied while the excitation current is being channeled, as is the case when the lock is released in the present example, the torque current is actively channeled rather than increasing the excitation current in order to establish a rotor magnetic flux with slow response time when the lock is released as described above, and is thereby possible to output torque for damping vibration with less current.

In the present example, the magnetic flux estimated value ($\phi_{est}$) is calculated from the relationship formula of formula (3) on the basis of the time constant ($\tau_\phi$) and the γ-axis current command value ($i_\gamma^*$), the σ-axis current command value ($i_\sigma^*$) is calculated from the relationship formula of formula (4) on the basis of the torque command value ($T_{m2}^*$) and the magnetic flux estimated value ($\phi_{est}$), and the drive motor 3 is controlled on the basis of the γ-axis current command value ($i_\gamma^*$) and the σ-axis current command value (V). It is thereby possible to very quickly calculate a torque current command value that will yield a torque command value and to curb the occurrence of vibration from park lock release shock, relative to the already excited rotor magnetic flux (field).

In the present example, excitation current is channeled from the time a signal for releasing the lock mechanism 11 is received from the lock release detection unit 13 until the elapse of the rising time ($T_2$) (equivalent to the "second time" of the present invention). The excitation current thereby continues to flow until the rotor magnetic flux rises, and the rotor magnetic flux can therefore be sufficiently excited.

In the present example, the lock of the lock mechanism 11 is released after the rising time ($T_2$) elapses from the time the signal for releasing the lock mechanism 11 is received. The rotor magnetic flux can thereby be excited up to the point in time the lock mechanism is released.

In the present example, the lock mechanism 11 is determined to be released when the shift lever position is changed from the parking position to a position other than parking. The timing at which the release of the lock mechanism 11 is detected can thereby be set to precede the actual operation of the lock mechanism 11, and the rotor magnetic flux can therefore be excited before the lock mechanism 11 operates.

In the present example, the lock mechanism 11 is determined to be released when the parking release switch of the shift lever has been released. The timing at which the release of the lock mechanism 11 is detected can thereby be set to precede the actual operation of the lock mechanism 11, and the rotor magnetic flux can therefore be excited before the lock mechanism 11 operates.

In the present example, the lock mechanism 11 is determined to be released when the shift lever position is the parking position and the brake switch of the brake pedal is switched from off to on. The timing at which the release of the lock mechanism 11 is detected can thereby be set to precede the actual operation of the lock mechanism 11, and the rotor magnetic flux can therefore be excited before the lock mechanism 11 operates.

In the present example, the lock mechanism 11 is determined to be released when the rotational speed of the drive motor 3 is lower than a designated determination threshold (equivalent to the "first determination threshold" of the present invention) and the brake switch of the brake pedal is switched from off to on. The timing at which the release of the lock mechanism 11 is detected can thereby be set to precede the actual operation of the lock mechanism 11, and the rotor magnetic flux can therefore be excited before the lock mechanism 11 operates.

In the present example, the excitation current after the control for damping the vibration from park lock release shock is lower than the excitation current during the damping control. The current consumption can thereby be reduced by lowering the excitation current after the vibration from park lock release shock has been suppressed, and the amount of the battery 1 consumed can be suppressed.

In the present example, the excitation current after the end of damping control is made to be less than the excitation current during damping control, after the elapse of the set time ($T_1$) from the time the release of the lock mechanism 11 is detected. The current consumption can thereby be reduced by lowering the excitation current after the vibration from park lock release shock has been suppressed, and the amount of the battery 1 consumed can be suppressed.

In the present example, after the release of the lock mechanism 11 has been detected, when the rotational speed of the drive motor 3 is lower than a designated rotational speed threshold (No) (equivalent to the "second determination threshold" of the present invention) and the torque command value is zero, the excitation current after the end of damping control is lower than the excitation current during damping control. The current consumption can thereby be reduced by lowering the excitation current after the vibration from park lock release shock has been suppressed, and the amount of the battery 1 consumed can be suppressed.

In the present example, the γ-axis current command value ($i_\gamma^*$) is calculated on the basis of the registered value of the slope sensor. The torque for suppressing the torsional vibration of the drive shaft 5 can thereby be estimated from the registered value of the slope sensor. Excitation current can be channeled and the magnetic flux can be raised in proportion to the magnetic flux needed to implement torque suitable for the slope; therefore, there is no need to increase the excitation current unnecessarily, and the amount of the battery 1 consumed can be suppressed.

In the present invention, either the vehicle speed may be acquired through communication by another controller such as a meter or a brake controller, or the vehicle speed v[m/s] may be determined by multiplying the tire dynamic radius by the rotator angular velocity ($\omega_{rm}$) and dividing the product by the final gear ratio, and the coefficient (3600/1000) may be used in a calculation to convert the units from [m/s] to [km/h].

Instead of using the γδ-axes current command values $I_\gamma^*$, $I_\delta^*$ to compute the slip angular velocity ($\omega_{se}$), the previously measured current value may be used to make the same computation. A value calculated in advance by design or experimentation may be used for the motor constant (M·Rr/Lr), and rotor temperatures and the magnitudes of current values may be stored in a table and referenced.

In the present example, the method for calculating the amount of torsion may use, for example, a map showing the correlation of the amount of torsion to the magnitude of the slope. In the present example, the amount of torsion in the drive shaft 5 may be calculated from the time the shift lever is set in the parking position, and the γ-axis current command value ($i_\gamma^*$) may be calculated using the map shown in FIG. 5. The amount of torsion is preferably calculated by comparing the value detected by the slope sensor before the shift lever is set in the parking position, and the value detected by the slope sensor after the shift lever is set in the parking position.

In the present example, the amount of torsion may be calculated by calculating the amount of change in the rotational speed of the drive motor 3 from the time the shift lever is set in the parking position, and applying a designated gain to this amount of change. The amount of change in the rotational speed is calculated from the amount of change in the rotator phase ($\phi_{re}$) of the drive motor 3. In the present example, the γ-axis current command value ($i_\gamma^*$) is preferably calculated using the map shown in FIG. 5.

Specifically, the current control unit 23 calculates the γ-axis current command value ($i_\gamma^*$) on the basis of either the amount of torsion in the drive shaft 5 or the rotational angle of the rotor of the drive motor 3, from the time the shift lever is set in the parking position. The excitation current can thereby be channeled and the magnetic flux can be raised in proportion to the magnetic flux needed to implement the torque in accordance with the amount of torsion in the drive shaft 5 and the rotational angle of the rotor; therefore, there is no need to increase the excitation current unnecessarily, and the amount of the battery 1 consumed can be suppressed.

In the present example, instead of calculating the γ-axis current command value ($i_\gamma^*$) from the amount of torsion in the drive shaft 5, the γ-axis current command value ($i_\gamma^*$) needed to suppress the vibration of park lock release shock may be calculated as an estimated command value of the excitation current. The excitation current command value is preferably calculated using a value set in advance with experimentation data or the like, relative to the slope information or the amount of change in the rotator phase ($\theta_{re}$).

As a modification of the present example, the current control unit 23 may make the excitation current flowing to the drive motor 3 higher than the excitation current ($I_1$) for a designated time period. This designated time period is set on the basis of the actual operation time (To) of the releasing of the lock mechanism 11 and a thermal time constant (τs) of the semiconductor elements.

The lock mechanism 11 is a mechanical mechanism. Therefore, after the current control unit 23 sends a startup signal to the lock mechanism 11 via the lock mechanism control unit 12, time is required for the lock mechanism to actually operate. This time, i.e. an operation time (To), is decided in accordance with the lock mechanism.

The semiconductor elements have a thermal time constant (τs) of 1 to 4 seconds, and the thermal time constant (τs) is longer than the operation time (To). Therefore, during the operation time (To) of the releasing of the lock mechanism 11, the temperature of the semiconductor elements can be kept to or below an allowable temperature even if a current exceeding the excitation current ($I_1$) is instantly channeled to the semiconductor elements.

As described above, in the modification, the current control unit 23 allows the excitation current up to an excitation current ($I_3$) (equivalent to the "third excitation current" of the present invention) higher than the excitation current ($I_1$) and controls the drive motor 3 during the operation time (To) (equivalent to the "first time" of the present invention). An excitation current higher than the excitation current ($I_1$) is thereby allowed during the operation time (To), whereby torque can be outputted with high responsiveness when park lock release shock causes great vibration and the torque for suppressing the vibration is great, and great vibrations can therefore be suppressed while increasing torque response.

In addition to the modification described above, the current control unit 23 allows the excitation current up to the excitation current ($I_3$) during the operation time (To). The excitation current ($I_3$) is a current value ($I_3=K_1 \times I_1$) set by multiplying the excitation current ($I_1$) by a gain $K_1$ decided from the operation time (To) and the thermal time constant (τs). The gain $K_1$ satisfies the following formula.

[Eq. 6]

$$1 \leq K_1 \leq \frac{1}{\exp\left(\frac{-T_0}{\tau_s}\right)} \tag{6}$$

As described above, the current control unit 23 allows the excitation current up to the excitation current ($I_3$) during the operation time (To) in the modification. A stronger magnetic flux can thereby be raised in the drive motor 3 because the excitation current can be increased to the excitation current ($I_3$) during the operation time (To).

As another modification of the present invention, the current control unit 23 allows the excitation current up to an excitation current ($I_4$) (equivalent to the "fourth excitation current" of the present invention) during damping control. The excitation current ($I_4$) is a current value set on the basis of the registered value of the slope sensor, and this current value has the characteristics of being higher than the excitation current ($I_1$) and of increasing as the slope increases.

It is thereby possible to channel an excitation current and raise the magnetic flux in proportion to the magnetic flux needed to achieve torque suitable for the slope; therefore, there is no need to increase the excitation current unnecessarily, and the amount of the battery 1 consumed can be suppressed. When the slope is steep and the park lock release shock causes pronounced vibration, the vibration can be suppressed.

As another modification of the present invention, the current control unit 23 allows the excitation current up to an excitation current ($I_5$) (equivalent to the "fifth excitation current" of the present invention) during damping control. The excitation current ($I_5$) is a current value set on the basis of the amount of torsion in the drive shaft 5 or the rotational angle of the rotor of the drive motor 3 from the time the shift lever is set in the parking position, and this current value has the characteristics of being higher than the excitation current ($I_1$) and of increasing as the amount of torsion or the rotational angle increases.

It is thereby possible to channel an excitation current and raise the magnetic flux in proportion to the magnetic flux needed to achieve torque suitable for the amount of torsion or the rotational angle of the rotor; therefore, there is no need to increase the excitation current unnecessarily, and the amount of the battery 1 consumed can be suppressed. When the amount of torsion or the rotational angle of the rotor is great and the park lock release shock causes great vibration, the vibration can be suppressed.

In the present example, the first condition and the second condition are used to determined that the vibration from park lock release shock has been suppressed, but this determination may be made using either one of the first condition or the second condition alone.

The lock release detection unit 13 described above is equivalent to the "detection means (or device)" of the present invention, the damping control unit 22 is equivalent to the "damping control means (or device)" of the present invention, the current control unit 23 is equivalent to the "current control means (or device)," the inverter 2 is equivalent to the "conversion circuit" of the present invention, and the lock mechanism control unit 12 is equivalent to the "lock mechanism control means (or device)."

Second Embodiment

Figure 9:
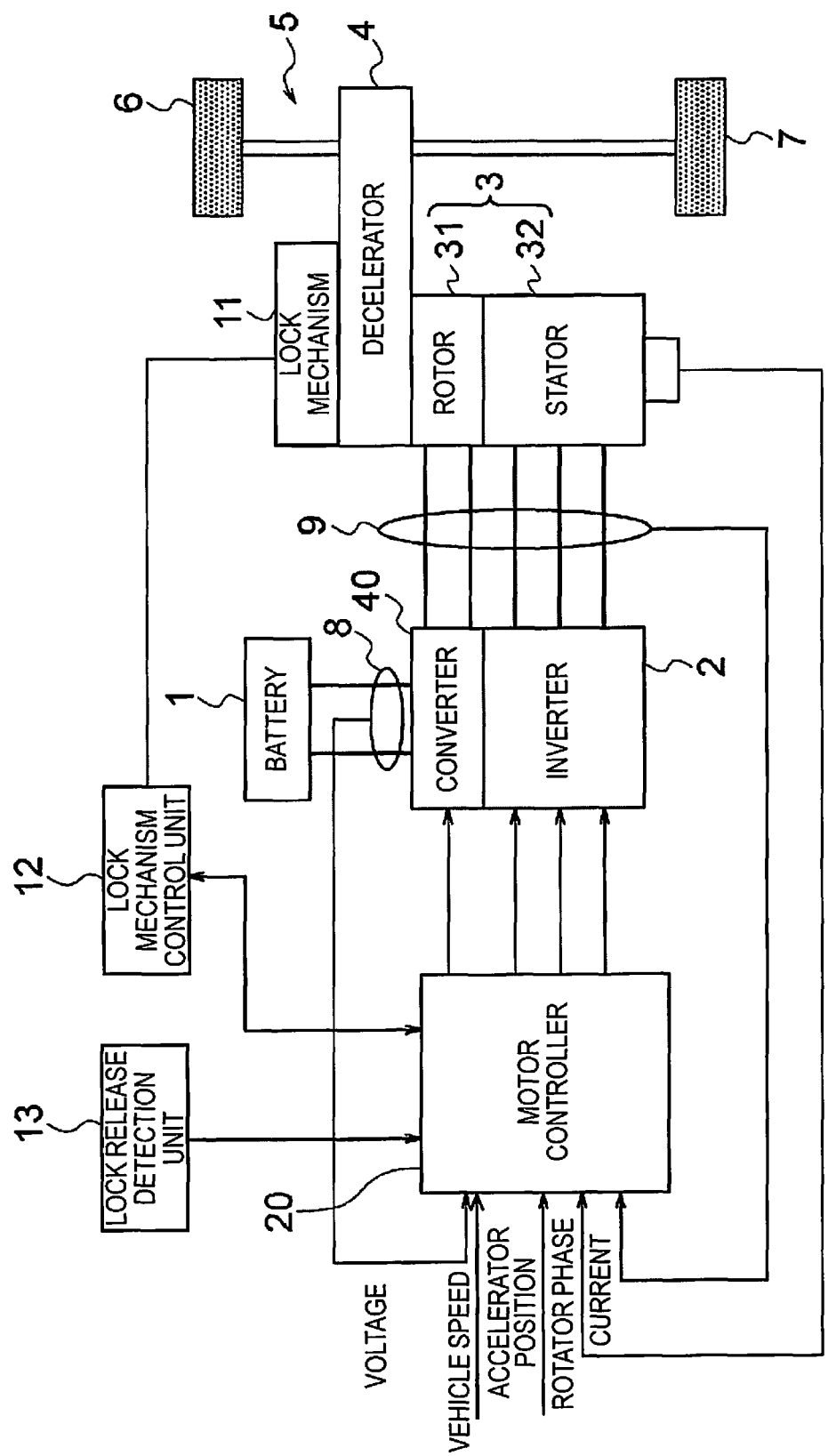
FIG. 9 is a block diagram of electric vehicle system according to another embodiment of the present invention.

FIG. 9 is a block diagram showing the configuration of an electric vehicle system equipped with a motor control device according to another embodiment of the present invention. The present example differs from the first embodiment described above in the configuration of the drive motor 3 and in that a converter 40 is provided. The configuration is otherwise the same as the first embodiment described above, and the statements thereof are incorporated as appropriate.

The drive motor 3 is a winding field motor, comprising a rotor 31 and a stator 32. The drive motor 3 is driven by rotor current supplied from the converter 40 to the rotor 31 and stator AC current supplied from the inverter 2 to the stator 32.

The current sensor 9 registers the stator AC current between the inverter 2 and the stator 32 as well as the rotor current between the converter 40 and the rotor 31, and outputs the registered values to the motor controller 20.

The converter 40, which is part of the motor control device of the present example, has a switching element. The switching element of the converter 40 is switched on and off by a drive signal from the motor controller 20, whereby the level of DC voltage supplied from the battery 1 is converted and outputted to the rotor 31.

Figure 10:
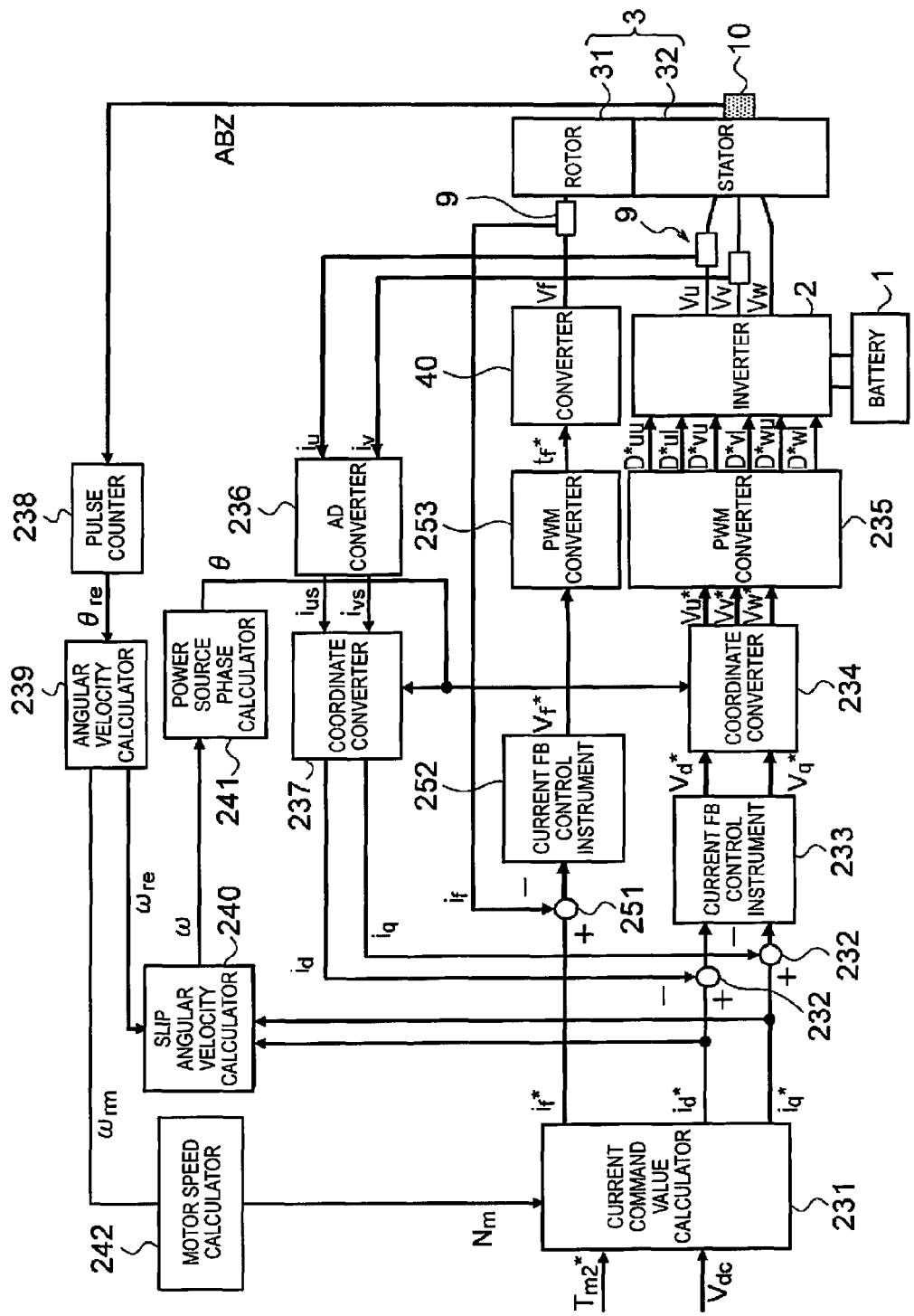
FIG. 10 is a block diagram of current control unit of motor control device according to another embodiment of the present invention.

Next, the configuration and control specifics of the current control unit 23 will be described using FIG. 10. FIG. 10 is a block diagram showing the configuration of the current control unit 23.

In addition to the configuration of the current control unit 23 according to the first embodiment, this current control unit 23 has a subtracter 251, a current FB control instrument 252, and a PWM converter 253, as shown in FIG. 10.

During normal control, the current command value calculator 231 refers to a map stored in advance and calculates a rotor current command value ($i_f^*$) and dq-axes current command values ($i_d^*$, $i_q^*$) on the basis of the torque command value ($T_{m2}^*$), the rotational speed ($N_m$) of the drive motor 3, and the voltage ($V_{dc}$) registered by the voltage sensor 8, and outputs these values to the subtracter 251 and the subtracters 232. This map optimizes the combined efficiency of the inverter 2 and the drive motor 3 in relation to the torque command value ($T_{m2}^*$), the motor rotational speed ($N_m$), and the registered voltage ($V_{dc}$), and command values having the greatest range of movement are stored in advance in this map.

Feedback control of the dq-axes currents from the subtracters 232 onward is the same as feedback control of the γδ-axes currents according to the first embodiment, and is therefore not described. Because the torque command value ($T_{m2}^*$) is a post-damping-control torque command value during normal control as well, the present example has the same damping effect as the first embodiment.

The subtracter 251 calculations the deviation between the rotor current command value ($i_f^*$) and the rotor current ($i_f$), and outputs the deviation to the current FB control instrument 252. The current FB control instrument 252 performs a control calculation so as to make the rotor current ($i_f$) match the rotor current command value ($i_f^*$) with a designated responsiveness and without steady deviation, and outputs a rotor voltage command value ($v_f^*$) to the PWM converter 253. Decoupling control may be added to the controls of the subtracter 251 and the current FB control instrument 252.

The PWM converter 253 generates a PWM signal (switching signal) ($t_f^*$) from the rotor voltage command value ($v_f^*$) and the DC voltage ($V_{dc}$), and outputs this signal to the converter 40. The switching element of the converter 40 is turned on and off on the basis of this signal, whereby the drive motor 3 can be driven with a torque according to the torque command value.

Next is a description of the control for damping the vibration of park lock release shock, as performed in the current control unit 23 shown in FIG. 10.

When the shift lever position is set to the parking position, the current control unit 23 calculates the amount of torsion in the drive shaft 5 on the basis of the registered value of the slope sensor. The current control unit 23 then refers to a map similar to FIG. 5 to calculate the rotor current command value ($i_f^*$) corresponding to the amount of torsion. This map is a map showing the relationship of the command value for exciting the rotor to the amount of torsion, similar to FIG. 5, but is a map adapted to a winding field motor.

Next, when the current control unit 23 receives a signal indicating that the lock mechanism 11 will be released from the lock release detection unit 13, the rotor current command value ($i_f^*$) is outputted from the current command value calculator 231 to the subtracter 251, and rotor current is channeled to the rotor 31 via the current FB control instrument 252, the PWM converter 253, and the converter 40. The rotor 31 can thereby be excited before the lock of the lock mechanism 11 is released.

When the lock of the lock mechanism 11 is actually released, the torsion in the drive shaft 5 is dispelled and the damping control of the damping control unit 22 is executed. Therefore, the post-damping-control torque command value ($T_{m2}^*$) is inputted to the current command value calculator 231.

The current command value calculator 231 refers to the map to calculate the dq-axes current command values on the basis of the torque command value ($T_{m2}^*$), the motor speed ($N_m$), and the rotor current command value ($i_f^*$), and outputs these values to the subtracter 251.

It is thereby possible, when the lock of the lock mechanism 11 is released and the torsion in the drive shaft 5 is dispelled, to improve torque responsiveness to the post-damping-control torque command value and to suppress the vibration from park lock release shock, because the rotor 31 has been excited in advance.

As described above, the motor control device of the present example can suppress the vibration from park lock release shock even when a winding field motor is used for the drive motor 3.

The invention claimed is:

1. A motor control device for a vehicle having a motor and a lock mechanism for locking a rotation of vehicle wheels, the motor control device comprising:
   a detection device configured to detect for release of the lock mechanism;
   a damping control device configured to suppress torsional vibration of a drive shaft; and
   a current control device configured to control current flowing to the motor on the basis of a motor torque command value set by the damping control device,
   the current control being configured to channel an excitation current for generating a magnetic flux in the motor on the basis of the detection result of the detection device while the motor is not rotating.

2. The motor control device according to claim 1, wherein the current control device is configured to channel the excitation current before the lock of the lock mechanism is released when the detection device has detected the release of the lock mechanism.

3. The motor control device according to claim 1, further comprising
   a conversion circuit having a semiconductor element, the conversion circuit being configured to convert power supplied from a battery, and to supply the power to the motor;
   the current control device being configured to enable the excitation current up to a first excitation current, and
   the first excitation current being a current value which enables the current flowing to the semiconductor element to be equal to or less than an allowable current of the semiconductor element when the motor is not rotating.

4. The motor control device according to claim 3, wherein the first excitation current is a current value lower than a second excitation current, and
   the second excitation current being a current value which enables the current flowing to the semiconductor element to be equal to or less than the allowable current of the semiconductor element when the motor is not rotating.

5. The motor control device according to claim 1, further comprising
   a conversion circuit having a semiconductor element, the conversion circuit being configured to convert power supplied from a battery, and to supply the power to the motor,
   the current control device being configured to enable the excitation current up to a third excitation current higher than a first excitation current during a first time,
   the first time representing a time duration from the time a signal for releasing the lock mechanism is received from the detection device until the time the lock of the lock mechanism is released, and the first time being set to a time duration longer than a thermal time constant of the semiconductor element, and
   the first excitation current being a current value which enables the current flowing to the semiconductor element to be equal to or less than an allowable current of the semiconductor element when the motor is not rotating.

6. The motor control device according to claim 5, wherein the current control device enables the excitation current up to the third excitation current, which is the product of the first excitation current and a gain, satisfying the following formula:

$$1 \le K_1 \le \frac{1}{\exp\left(\frac{-T_0}{\tau_s}\right)}$$

where $K_1$ represents the gain, $T_0$ represents the first time, and $\tau_s$ represents the thermal time constant.

7. The motor control device according to claim 1, wherein the current control device is configured to channel a torque current of the motor on the basis of the torque command value before the lock of the lock mechanism is released.

8. The motor control device according to claim 7, wherein after the lock of the lock mechanism has been released, the current control device is configured to maintain the excitation current channeled before the lock of the lock mechanism was released.

9. The motor control device according to claim 7, wherein the current control device is configured to calculate a magnetic flux estimated value on the basis of a time lag in at least one of the current response and a magnetic flux response of the motor and an excitation current command value of the motor,
   calculate a torque current command value of the motor on the basis of the torque command value, the magnetic flux estimated value, and a motor constant, and
   control the motor on the basis of the torque current command value and the excitation current command value, and
   satisfy the following formulas:

$$\phi_{est} = \frac{M}{\tau_\phi + 1} i_\gamma^*$$

$$i_\delta = \frac{T_{m2}^*}{K_{Te} \cdot \phi_{est}} i_r^*$$

where $\phi_{est}$ represents the magnetic flux estimated value, M represents mutual inductance of the motor, $\tau_\phi$ represents the time lag, $i_\gamma^*$ represents the excitation current command value, $i_\delta$ represents the torque current command value, $T_{m2}^*$ represents the torque command value, and $K_{Te}$ represents the motor constant.

10. The motor control device according to claim 1, wherein
   the current control device is configured to channel the excitation current from a time a signal indicating release of the lock mechanism is received from the detection device, at least until an elapsing of a second time, and
   the second time is equal to or greater than a time lag of the magnetic flux response of the motor to the excitation current.

11. The motor control device according to claim 10, further comprising:
   a lock mechanism control device configured to control the lock mechanism;
   the lock mechanism control device being configured to release a lock of the lock mechanism when the second time has elapsed from the time the signal was received by the current control device.

12. The motor control device according to claim 1, wherein
the detection device is configured to determine release of the lock mechanism when the position of a shift lever of the vehicle has been changed from a parking position to a position other than parking.

13. The motor control device according to claim 1, wherein
the detection device is configured to determine release of the lock mechanism when a parking release switch of a shift lever of the vehicle has been set to a release state.

14. The motor control device according to claim 1, wherein
the detection device is configured to determine release of the lock mechanism when the position of a shift lever of the vehicle is in a parking position and a brake switch of a brake pedal of the vehicle has been switched from off to on.

15. The motor control device according to claim 1, wherein
the detection device is configured to determine release of the lock mechanism when the rotational speed of the motor is lower than a predetermined first determination threshold and a brake switch of a brake pedal of the vehicle has been switched from off to on.

16. The motor control device according to claim 1, wherein
the current control device is configured to cause the excitation current, after the end of damping control performed by the damping control device, to be less than the excitation current during damping control performed by the damping control device.

17. The motor control device according to claim 16, wherein
the current control device is configured to cause the excitation current, after damping control has ended, to be less than the excitation current during damping control after a predetermined time has elapsed from a time the detection device detects release of the lock mechanism.

18. The motor control device according to claim 16,
the current control device is configured to cause the excitation current, after damping control has ended, to be less than the excitation current during damping control after the detection device has detected release of the lock mechanism, and when the motor speed is lower than a predetermined second determination threshold and the torque command value is zero.

19. The motor control device according to claim 1, wherein
the current control device is configured to calculate the excitation current command value of the motor on a basis of a registered value of a slope sensor configured to register the slope of the vehicle.

20. The motor control device according to claim 1, wherein
the current control device is configured to calculate the excitation current command value of the motor on a basis of one of an amount of torsion of a drive shaft of the vehicle and a rotational angle of a rotor of the motor from a time a shift lever of the vehicle is set to a parking position.

21. The motor control device according to claim 1, further comprising
a conversion circuit having a semiconductor element, the conversion circuit being configured to convert power supplied from a battery, and to supply the power to the motor,
the current control device being configured to enable the excitation current up to a fourth excitation current higher than a first excitation current, and to set the fourth excitation current on the basis of a registered value of a slope sensor for registering a slope of the vehicle, and
the first excitation current being a current value which enables the current flowing to the semiconductor element to be equal to or less than an allowable current of the semiconductor element when the motor is not rotating.

22. The motor control device according to claim 1, further comprising
a conversion circuit having a semiconductor element, the conversion circuit being configured to convert power supplied from a battery, and to supply the power to the motor,
the current control device being configured to set the excitation current to a fifth excitation current higher than a first excitation current, and to set the fifth excitation current on the basis of one of an amount of torsion of a drive shaft of the vehicle and a rotational angle of a rotor of the motor from a time the position of a shift lever of the vehicle is changed to a parking position, and
the first excitation current being a current value which enables the current flowing to the semiconductor element equal to or less than the allowable current of the semiconductor element when the motor is not rotating.

23. A method for controlling a motor and a lock mechanism for locking a rotation of vehicle wheels; the motor control device comprising:
detecting with a detection device release of the lock mechanism;
suppressing torsional vibration of a drive shaft by a damping control device;
controlling current flowing to the motor on the basis of a motor torque command value set by the damping control device; and
channeling an excitation current for generating a magnetic flux in the motor on the basis of the detection result of the detection device while the motor is not rotating.

* * * * *